US012686984B2

(12) United States Patent
Curson et al.

(10) Patent No.: US 12,686,984 B2
(45) Date of Patent: Jul. 21, 2026

(54) EXPANDED MULTILAYER INTEGRAL GEOGRIDS AND METHODS OF MAKING AND USING SAME

(71) Applicant: Tensar International Corporation, Alpharetta, GA (US)

(72) Inventors: Andrew Curson, Burnley (GB); Tom-Ross Jenkins, Baildon (GB); Andrew Edward Waller, Newton le Willows (GB); Daniel John Gallagher, Adlington (GB); Daniel Mark Baker, Broomfield, CO (US); Manoj Kumar Tyagi, Fayetteville, GA (US); Joseph Cavanaugh, Cumming, GA (US)

(73) Assignee: Tensar International Corporation, Alpharetta, GA (US)

( * ) Notice: Subject to any disclaimer, the term of this patent is extended or adjusted under 35 U.S.C. 154(b) by 0 days.

(21) Appl. No.: 19/098,281

(22) Filed: Apr. 2, 2025

(65) Prior Publication Data
US 2025/0230620 A1     Jul. 17, 2025

Related U.S. Application Data

(62) Division of application No. 18/067,918, filed on Dec. 19, 2022, now Pat. No. 12,291,829.

(Continued)

(51) Int. Cl.
*E02D 3/02*          (2006.01)
*B29C 48/00*         (2019.01)
(Continued)

(52) U.S. Cl.
CPC ............. *E02D 3/02* (2013.01); *B29C 48/0012* (2019.02); *B29C 48/21* (2019.02); *B32B 3/266* (2013.01);
(Continued)

(58) Field of Classification Search
CPC ..... B29C 48/0012; B29C 48/21; B32B 3/266; B32B 5/18; B32B 7/02; B32B 27/065; B32B 27/32; B32B 37/206; E02D 3/02
See application file for complete search history.

(56) References Cited

U.S. PATENT DOCUMENTS 3,252,181 A      5/1966    Hureau
3,317,951 A      5/1967    Hureau
(Continued)

*Primary Examiner* — Maria V Ewald
*Assistant Examiner* — Ethan Weydemeyer
(74) *Attorney, Agent, or Firm* — Dunlap Bennett & Ludwig PLLC

(57)          ABSTRACT

An expanded multilayer integral geogrid includes a plurality of oriented strands interconnected by partially oriented junctions having an array of openings therein that is produced from a coextruded or laminated multilayer polymer starting sheet. The integral geogrid has a multilayer construction, with at least one inner layer thereof having a structure that is expanded relative to at least one other layer of the multiple layers. By virtue of the expanded inner layer structure, the expanded multilayer integral geogrid provides for increased layer compressibility under load, resulting in enhanced material properties that provide performance benefits to use of the expanded multilayer integral geogrid in soil geosynthetic reinforcement, and economic benefits compared to a like integral geogrid without an expanded inner layer structure.

17 Claims, 17 Drawing Sheets

Related U.S. Application Data

(60) Provisional application No. 63/291,624, filed on Dec. 20, 2021.

(51) Int. Cl.

| | |
|---|---|
| *B29C 48/21* | (2019.01) |
| *B32B 3/26* | (2006.01) |
| *B32B 5/18* | (2006.01) |
| *B32B 7/02* | (2019.01) |
| *B32B 27/06* | (2006.01) |
| *B32B 27/32* | (2006.01) |
| *B32B 37/20* | (2006.01) |

(52) U.S. Cl.
CPC .................. *B32B 5/18* (2013.01); *B32B 7/02* (2013.01); *B32B 27/065* (2013.01); *B32B 27/32* (2013.01); *B32B 37/206* (2013.01); *B32B 2250/03* (2013.01); *B32B 2250/40* (2013.01); *B32B 2264/1021* (2020.08); *B32B 2264/1022* (2020.08); *B32B 2264/1026* (2020.08); *B32B 2264/1027* (2020.08); *B32B 2264/104* (2013.01); *B32B 2264/108* (2013.01); *B32B 2266/025* (2013.01); *B32B 2305/02* (2013.01); *B32B 2305/022* (2013.01); *B32B 2305/30* (2013.01); *B32B 2307/516* (2013.01); *B32B 2307/518* (2013.01); *B32B 2309/105* (2013.01); *B32B 2323/00* (2013.01); *E02D 2250/0015* (2013.01); *E02D 2300/0006* (2013.01); *E02D 2300/0046* (2013.01); *E02D 2300/0051* (2013.01); *E02D 2300/0079* (2013.01)

(56) References Cited

U.S. PATENT DOCUMENTS

| | | | | |
|---|---|---|---|---|
| 3,496,965 | A | 2/1970 | Hureau | |
| 4,374,798 | A | 2/1983 | Mercer | |
| 4,470,942 | A | 9/1984 | Beretta | |
| 4,590,029 | A | 5/1986 | Mercer | |
| 4,743,486 | A | 5/1988 | Mercer | |
| 4,756,949 | A | 7/1988 | Mercer | |
| 4,808,358 | A | 2/1989 | Beretta | |
| 5,053,264 | A | 10/1991 | Beretta | |
| 5,419,659 | A | 5/1995 | Mercer | |
| 7,001,112 | B2 | 2/2006 | Walsh | |
| 9,556,580 | B2 | 1/2017 | Walsh | |
| 10,024,002 | B2 | 7/2018 | Walsh | |
| 10,501,896 | B2 | 12/2019 | Walsh | |
| 2015/0203648 | A1* | 7/2015 | Yahara .................... | C08J 9/141 |
| | | | | 521/150 |
| 2017/0359967 | A1* | 12/2017 | Tetrault .................... | A41D 1/06 |
| 2018/0203648 | A1 | 7/2018 | Chang et al. | |
| 2018/0298582 | A1 | 10/2018 | Shelton et al. | |

* cited by examiner

705

735

700

Expanded core vs monolayer product performance comparison

| Sample # | Total sheet thickness (mm) | Sheet structure | Geometry | Finished product unit weight (gm/sq.m) | Performance (mm): as measured by Avg surface deformation for last 500 passess in small scale testing |
|---|---|---|---|---|---|
| 1 | 4.15 | monolayer PP | Triangles | 200 | 61.8 |
| 2 | 4.2 | 0.5mm PP/3.2mm expanded PP/0.5mm PP | Triangles | 171 | 61.6 |
| 3 | 4.55 | monolayer PP | Triangles | 217 | 46.4 |
| 4 | 6.2 | 1mm PP/4.2mm expanded PP/1mm PP | Triangles | 215 | 37.2 |

Principle 1: Using expanded core technology, product weight can be reduced and still achieve equivalent performance
Example  Sample #2 is 14.5% lighter than smaple #1, with equivalent performance Principle 2: Using expanded core technology, at equivalent finished product weight, higher performance can be achieved
Example  Sample #4 has similar weight as sample #3, but 19.8% better performance

FIG. 17

EXPANDED MULTILAYER INTEGRAL GEOGRIDS AND METHODS OF MAKING AND USING SAME

CROSS-REFERENCE TO RELATED APPLICATIONS

This application is related to and claims the benefit of priority to U.S. Provisional Application for Patent No. 63/291,624 filed Dec. 20, 2021.

BACKGROUND OF THE INVENTION

1. Field of the Invention

The present invention relates generally to integral geogrids and other oriented grids used for structural or construction reinforcement and stabilization, and other geotechnical purposes. More particularly, the present invention relates to such integral geogrids having an expanded multilayer construction that provides enhanced compressibility of the integral geogrid. The present invention also relates to such integral geogrids having both enhanced stiffness characteristics and the ability to engage with and stabilize a greater variety and range of quality of aggregates, and, as well as other desirable characteristics as disclosed herein.

This invention also relates to the method of producing such expanded multilayer integral geogrids. Lastly, the present invention relates to the use of such expanded multilayer integral geogrids for soil and particulate reinforcement and stabilization, and methods of such reinforcement and stabilization.

For the purpose of this invention, the term "integral geogrid" is intended to include integral geogrids and other integral grid structures made by orienting (i.e., stretching) a polymeric starting material in the form of a sheet or a sheet-like shape of a requisite thickness and having holes or depressions made or formed therein.

2. Description of Related Art

Polymeric integral grid structures having mesh openings defined by various geometric patterns of substantially parallel, oriented strands and junctions therebetween, such as integral geogrids, have been manufactured and sold for over 35 years. Such grids are manufactured by extruding and forming an integrally cast starting sheet having a specified pattern of holes or depressions which is followed by the controlled uniaxial or biaxial stretching and orientation of the sheet into highly oriented strands and partially oriented junctions defining mesh openings formed by the holes or depressions. Such stretching and orienting of the sheet in either a uniaxial or a biaxial direction develops strand tensile strength and modulus in the corresponding stretch direction. These integral oriented polymer grid structures can be used for retaining or stabilizing particulate material of any suitable form, such as soil, earth, sand, clay, gravel, etc. and in any suitable location, such as on the side of a road or other cutting or embankment, beneath a road surface, runway surface, etc.

Various shapes and patterns of holes have been experimented with to achieve higher levels of strength to weight ratio, or to achieve faster processing speeds during the manufacturing process. Orientation is accomplished under controlled temperatures and strain rates. Some of the variables in this process include draw ratio, molecular weight, molecular weight distribution, and degree of branching or cross linking of the polymer.

The manufacture and use of such integral geogrids and other integral grid structures can be accomplished by well-known techniques. As described in detail in U.S. Pat. No. 4,374,798 to Mercer, U.S. Pat. No. 4,590,029 to Mercer, U.S. Pat. No. 4,743,486 to Mercer and Martin, U.S. Pat. No. 4,756,946 to Mercer, and U.S. Pat. No. 5,419,659 to Mercer, a starting polymeric sheet material is first extruded and then punched to form the requisite defined pattern of holes or depressions. The integral geogrid is then formed by the requisite stretching and orienting of the punched sheet material.

Such integral geogrids, both uniaxial integral geogrids and biaxial integral geogrids (collectively "integral geogrids," or separately "uniaxial integral geogrid(s)" or "biaxial integral geogrid(s)") were invented by the aforementioned Mercer in the late 1970s and have been a tremendous commercial success over the past 35 years, totally revolutionizing the technology of reinforcing soils, roadway underpavements and other civil engineering structures made from granular or particulate materials.

Mercer discovered that by starting with a relatively thick, substantially uniplanar polymer starting sheet, preferably on the order of 1.5 mm (0.059055 inch) to 4.0 mm (0.15748 inch) thick, having a pattern of holes or depressions whose centers lie on a notional substantially square or rectangular grid of rows and columns, and stretching the starting sheet either unilaterally or biaxially so that the orientation of the strands extends into the junctions, a totally new substantially uniplanar integral geogrid could be formed. As described by Mercer, "uniplanar" means that all zones of the sheet-like material are symmetrical about the median plane of the sheet-like material.

In U.S. Pat. No. 3,252,181 to Hureau, U.S. Pat. No. 3,317,951 to Hureau, U.S. Pat. No. 3,496,965 to Hureau, U.S. Pat. No. 4,470,942 to Beretta, U.S. Pat. No. 4,808,358 to Beretta and U.S. Pat. No. 5,053,264 to Beretta, the starting material with the requisite pattern of holes or depressions is formed in conjunction with a cylindrical polymer extrusion and substantial uniplanarity is achieved by passing the extrusion over an expanding mandrel. The expanded cylinder is then slit longitudinally to produce a flat substantially uniplanar starting sheet.

Another integral geogrid is described in U.S. Pat. No. 7,001,112 to Walsh (hereinafter the "Walsh '112 patent"), assigned to Tensar International Limited, an associated company of the assignee of the instant application for patent, Tensar International Corporation, Inc. (hereinafter "Tensar") of Atlanta, Georgia. The Walsh '112 patent discloses oriented polymer integral geogrids including a biaxially stretched integral geogrid in which oriented strands form triangular mesh openings with a partially oriented junction at each corner, and with six highly oriented strands meeting at each junction (hereinafter sometimes referred to herein as "triaxial integral geogrid"). The triaxial integral geogrids of the Walsh '112 patent have been commercialized by Tensar to substantial success.

Still another integral geogrid is disclosed in U.S. Pat. No. 9,556,580 to Walsh, U.S. Pat. No. 10,024,002 to Walsh, and U.S. Pat. No. 10,501,896 to Walsh, all of which are assigned to Tensar Technologies Limited, another associated company of the assignee of the instant application for patent. The aforementioned Walsh U.S. Pat. Nos. 9,556,580, 10,024, 002, and 10,501,896 disclose an integral geogrid having what is known to one skilled in the art as a high aspect ratio, i.e., a ratio of the thickness or height of the strand cross section to the width of the strand cross section, that is greater than 1.0. While it has been shown that the performance of multiaxial integral geogrids can be improved by using a geogrid structure that has ribs with an aspect ratio greater than 1.0, the increase in aspect ratio comes with increases in the overall amount of polymer required, thus increasing the weight and cost of the geogrid.

Traditionally, the polymeric materials used in the production of integral geogrids have been high molecular weight homopolymer or copolymer polypropylene, and high density, high molecular weight polyethylene. Various additives, such as ultraviolet light inhibitors, carbon black, processing aids, etc., are added to these polymers to achieve desired effects in the finished product and/or manufacturing efficiency.

And, also traditionally, the starting material for production of such integral geogrids has typically been a substantially uniplanar sheet that has a monolayer construction, i.e., a homogeneous single layer of a polymeric material.

While an integral geogrid produced from the above-described conventional starting materials exhibits generally satisfactory properties, it is structurally and economically advantageous to produce integral geogrids having a relatively higher degree of stiffness suitable for the demands of services such as geosynthetic reinforcement or having other properties desirable for particular geosynthetic applications.

Thus, a need has existed for a starting material not only that is suitable for the process constraints associated with the production of integral geogrids, but also that once the integral geogrid has been produced and is in service, provides a higher degree of stiffness than that associated with conventional geogrid starting materials or provides other desirable properties not available with current monolayer integral geogrids.

Further, while an integral geogrid produced from the above-described conventional starting materials and in conventional configurations may exhibit generally satisfactory properties, it is structurally and economically advantageous to produce an integral geogrid having a structure and geometry with the ability to engage with and stabilize a greater variety and range of quality of aggregates that is suitable for the demands of services such as geosynthetic reinforcement or having other properties desirable for particular geosynthetic applications.

It is intended that the present invention be applicable to all integral grids regardless of the method of starting sheet formation or the method of orienting the starting material into the integral geogrid or grid structure. The subject matter of the foregoing U.S. Pat. Nos. 3,252,181, 3,317,951, 3,496,965, 4,470,942, 4,808,358, 5,053,264, 7,001,112, 9,556,580, 10,024,002, and 10,501,896, is expressly incorporated into this application by reference as if the disclosures were set forth herein in their entireties. These patents are cited as being illustrative, and are not considered to be inclusive, or to exclude other techniques known in the art for the production of integral polymer grid materials.

Despite the functional characteristics available with current monolayer integral geogrids, there are performance improvements that have yet to be attained over prior art integral geogrids. One such enhancement is disclosed in U.S. application Ser. No. 15/766,960 (hereinafter "the '960 application"; published as U.S. Patent Application Publication No. 2018/0298582 A1), also assigned to Tensar International Limited. The '960 application discloses various embodiments for coextruded multilayer polymer sheets as the starting material for fabrication of integral geogrids. By virtue of the coextruded multilayer starting material construction, the coextruded multilayer sheet components, after extrusion and orientation, produce integral geogrids having enhanced material properties that provide performance benefits in soil geosynthetic reinforcement.

One of the embodiments disclosed in the '960 application is a three layer integral geogrid produced from a coextruded three layer starting sheet in which the middle layer of the oriented integral geogrid has an expanded or "foamed" structure. According to the '960 application, the only advantages of the expanded or foamed multilayer structure are reduced raw material cost and reduced geogrid weight and "may include desirable physical and chemical properties of the foamed layer per se." No other benefits are disclosed. The subject matter of the '960 application is expressly incorporated into this application by reference as if the disclosure was set forth herein in its entirety.

To date, current integral geogrid products manufactured from current production/process technologies can generate multiaxial geogrid products with desirable attributes and features; however, current process/production technology does not allow for changes in material type within the cross section of the overall geogrid. As a result, to enhance the desired physical, mechanical, and geometrical properties that improve performance, significant increases in the amount of polymer is required.

Additionally, current process/production technology limits the ability to increase or enhance certain parameters that drive performance, while concurrently controlling or not changing other parameters that, if changed, reduce performance.

Further, current process/production technology does not address the use of differing polymer materials in different portions of the geogrid structure as a means of maximizing performance.

Accordingly, a need exists for integral geogrids that allow for better "initial compatibility" between the aggregate and the geogrid, thus maximizing the aggregate density after compaction is complete, and thereby minimizing any possible remaining aggregate movement or repositioning that would normally occur after compaction and upon initial phases of "in service" loadings. Even more specifically, a need exists for an integral geogrid having the aforementioned attributes by providing for increased layer compressibility under load. The term "initial compatibility" is used herein to mean a maximizing of the aggregate density after compaction is complete to thereby minimize potential movement or positioning of the aggregate that would normally occur after compaction and upon initial phases of the "in service" loadings.

SUMMARY OF THE INVENTION

An object of the instant invention, therefore, is to deliver improved functional performance from multiaxial integral geogrids by enhancing certain physical, mechanical, and geometrical properties of the multiaxial integral geogrid structure that improves functional performance, such as by modifying and/or incorporating other new physical, mechanical, and geometrical properties. By careful physical positioning and manipulating of the amount of different polymeric materials that have the desired mechanical and physical properties in specific locations of integral geogrid structures, and by optimizing all other physical parameters of the geogrid structure, significant performance improvements can be achieved.

More specifically, subsequent to the filing of the '960 application, it has been surprisingly discovered that significantly improved initial compatibility between the aggregate and the expanded multilayer integral geogrid can be achieved if certain parameters for the foamed or expanded layer are included in the geogrid, as disclosed herein. These parameters include the following:

1. the total height or vertical thickness of the strand (or rib) of the multilayer integral geogrid at the thinnest height of the strand (likely the midpoint of the strand) is, for a foamed middle layer, from 1 mm to 4 mm, and, for an expanded middle layer, from 1 mm to 5 mm, and preferably, for a foamed middle layer, from 1.874 mm to 3.095 mm, and, for an expanded middle layer, from 1.97 mm to 3.36 mm;

2. the voids of the foamed or expanded middle layer comprise from 5% to 60% by volume of the foamed or expanded layer, and preferably, from 20% to 40%;

3. the foamed or expanded middle layer has a minimum compressibility or "crushability" or height reduction after compaction is complete of from 5% up to as much as 75%, with a preferred compressibility range of 20% to 60%, and a more preferred compressibility range of 30% to 50%;

4. the foamed or expanded middle layer has an aspect ratio such that its height, i.e., vertical thickness, is from 1.0:1 to 3.5:1 to the height or vertical thickness of the thinnest outer layer, and preferably, for a foamed middle layer, is from 1.0:1 to 1.16:1, and for an expanded middle layer, is from 1.7:1 to 2.46:1; and 5. the foamed or expanded middle layer has a height or vertical thickness that is at least forty percent (40%) of the overall height of the final integral geogrid, and preferably at least seventy percent (70%).

By including the above physical properties in the expanded multilayer integral geogrid in accordance with the present invention, the initial compatibility between the aggregate and the geogrid is maximized after compaction is complete. And, by maximizing the initial compatibility, any possible remaining aggregate movement or repositioning that would normally occur after compaction in the initial phases of "in service" loading is minimized. Thus, the roadway other transporting surface is better stabilized and reinforced for future traffic thereon.

Another object of the present invention is to provide economic benefits for use of an integral geogrid having the expanded multilayer structure. If an integral geogrid having strands with a higher aspect ratio is desired, the expanded layer according to the present invention can provide that higher aspect ratio while using the same overall polymer content (i.e., "amount" of polymer) as a similarly configured integral geogrid not having an expanded layer. Or, if an integral geogrid having strands with a same aspect ratio as a similarly configured integral geogrid is desired, the expanded layer according to the present invention can provide that same aspect ratio while using less overall polymer content (i.e., "amount" of polymer). Accordingly, the expanded multilayer integral geogrids of the present invention, in addition to the structural and performance enhancements associated therewith, can provide significant economic benefits, i.e., achieving a higher aspect ratio at a same cost, or achieving a same aspect ratio at a lower cost.

Accordingly, to attain the aforementioned object, the present invention is directed to integral geogrids having a multilayer construction, with at least one layer thereof having a structure that is expanded relative to at least one other layer of the multiple layers. These multilayer geogrids are often referred to herein as integral geogrids having at least one layer thereof with a structure that is expanded relative to at least one other layer of the multiple layers, or, more simply, an "expanded multilayer integral geogrid" or "expanded multilayer integral geogrids." By virtue of the expanded layer structure, the expanded multilayer integral geogrids of the present invention provide for increased layer compressibility under load, and other desirable characteristics.

More specifically, the layer having the expanded structure contains a distribution of voids therein. The voids may be associated with a foamed construction of the layer, or may be associated with a particulate filler that is distributed throughout the layer in order to create the expansion of the layer.

Further, the multilayer construction of the expanded multilayer integral geogrids may include layers that are coextruded, or layers that are laminated. The expansion of the expanded layer may occur during extrusion/lamination or stretching/orientation, or both.

And, the resulting expanded multilayer integral geogrids having the plurality of oriented multilayer strands interconnected by the partially oriented multilayer junctions and having an array of openings therebetween may be configured in any of a variety of repeating geometric patterns, such as described herein.

According to the present invention, a starting material for making expanded multilayer integral geogrids includes a multilayer polymer starting sheet having holes or depressions therein that provide an array of shaped openings when the starting material is biaxially stretched. The multilayer polymer starting sheet includes an expandable inner layer having a foamed construction or having a particulate filler dispersed therein to create the expansion of the layer. According to preferred embodiments, the layers of the multilayer polymer starting sheet may be coextruded, or may be laminated to one another.

According to specific embodiments of the present invention, the expanded multilayer integral geogrids include a plurality of oriented multilayer strands interconnected by partially oriented multilayer oriented junctions and having an array of openings therebetween that has at least one expanded layer interposed between two non-expanded layers. According to one embodiment, the expanded multilayer integral geogrid is a rectangular geogrid having a repeating geometric pattern of partially oriented junctions interconnecting oriented strands which define rectangular openings. According to another embodiment, the expanded multilayer integral geogrid is a triaxial geogrid having a repeating hexagonal geometric pattern of partially oriented junctions interconnecting oriented strands which define triangular openings. And, according to yet another embodiment, the expanded multilayer integral geogrid is a geogrid having a repeating geometric pattern of partially oriented junctions interconnecting oriented strands which form outer hexagons, each of which outer hexagons surrounds and supports six inner interconnected oriented strands formed into the shape of an inner hexagon and defining a smaller hexagonal opening, referred to herein as a "repeating floating hexagon within a hexagon pattern."

According to still another embodiment of the present invention, a soil construction includes a mass of particulate material strengthened and stabilized by embedding therein an expanded multilayer integral geogrid having a repeating geometric pattern and having an expanded inner layer.

According to yet another embodiment of the present invention, a method of making a starting material for an expanded multilayer integral geogrid includes providing a multilayer polymer starting sheet having an expandable inner layer, and providing holes or depressions therein that provide a repeating geometric pattern of partially oriented junctions interconnecting oriented strands, and defining openings when the starting material is biaxially stretched.

According to another embodiment of the present invention, a method of making an expanded multilayer integral geogrid includes providing a multilayer polymer starting sheet having an expandable inner layer, providing holes or depressions therein, and biaxially stretching the expandable layer multilayer polymer sheet having the holes or depressions therein so as to provide a repeating geometric pattern of partially oriented junctions interconnecting oriented strands, and defining openings therein.

And, according to yet another embodiment of the present invention, a method of strengthening a mass of particulate material includes embedding in the mass of particulate material an expanded multilayer integral geogrid having a repeating geometric pattern of partially oriented junctions interconnecting oriented strands defining openings and having an expanded inner layer.

Accordingly, it is an object of the present invention to provide a multilayer integral geogrid with at least one inner layer thereof having a structure that is expanded relative to at least one other layer of the multiple layers, so as to provide an integral geogrid having increased layer compressibility under load.

Thus, another object of the present invention to provide a starting material for making an expanded multilayer integral geogrid. The starting material includes a multilayer polymer starting sheet having an expandable inner layer and holes or depressions therein that provide an array of shaped openings when the starting material is biaxially stretched. The expandable layer of the multilayer polymer starting sheet includes having a foamed construction or having a particulate filler dispersed therein to create expansion of the inner layer, and the layers of the multilayer polymer starting sheet may be coextruded, or may be laminated to one another.

Another object of the present invention is to provide expanded multilayer integral geogrids having a plurality of oriented multilayer strands interconnected by partially oriented multilayer junctions and having an array of openings therebetween that is produced from a multilayer polymer starting sheet having an expandable inner layer. The expanded multilayer integral geogrid may be a rectangular geogrid having a repeating geometric pattern of partially oriented junctions interconnecting oriented strands defining rectangular openings, a triaxial geogrid having a repeating geometric pattern of partially oriented junctions interconnecting oriented strands defining triangular openings, or a geogrid having a repeating geometric pattern of partially oriented junctions interconnecting oriented strands defining outer hexagons, each of which surrounds and supports an inner oriented hexagon, i.e., the "repeating floating hexagon within a hexagon pattern."

An associated object of the present invention is to provide a geometry that can engage with and stabilize a greater variety and range of quality of aggregates than geometries associated with prior geogrid structures, while at the same time providing an enhanced compressibility, and other desirable characteristics.

Still another object of the present invention is to provide a soil construction that includes a mass of particulate material strengthened and stabilized by embedding therein an expanded multilayer integral geogrid having a repeating geometric pattern and having an expanded inner layer.

Yet another object of the present invention is to provide a method of making a starting material for expanded multilayer integral geogrids that includes providing a multilayer polymer starting sheet having an expandable inner layer, and providing holes or depressions therein that provide a repeating geometric pattern of partially oriented junctions interconnecting oriented strands, and openings when the starting material is biaxially stretched. The expandable inner layer may be produced by providing a foamed construction, or by dispersing a particulate filler therein. The multilayer polymer starting sheet may be produced by coextruding the plurality of layers, or by laminating the plurality of layers to one another.

Another object of the present invention is to provide a method of making expanded multilayer integral geogrids, which includes providing a multilayer polymer starting sheet having an expandable inner layer, providing holes or depressions therein, and biaxially stretching the multilayer polymer starting sheet so as to provide a repeating geometric pattern of partially oriented junctions interconnecting oriented strands, and openings. The method of making the above-described rectangular opening or triangular opening integral geogrids can employ known geogrid fabrication methods, such as those described in the aforementioned U.S. Pat. Nos. 4,374,798, 4,590,029, 4,743,486, 5,419,659, 7,001,112, 9,556,580, 10,024,002, and 10,501,896 as well as in other patents. The method of making the above-described integral geogrid having a repeating geometric pattern of partially oriented junctions interconnecting oriented strands, and defining outer hexagons, each of which surrounds and supports an oriented inner hexagon, can employ a fabrication method as described hereinafter.

More specifically, it is an object of the present invention to provide a method of making expanded multilayer integral geogrids in which the expanded inner layer is produced by first providing a foamed construction in a layer of the multilayer polymer starting sheet, and then biaxially orienting the multilayer polymer starting sheet so as to stretch the foamed material and create a distribution of voids of the foam.

Correspondingly, it is another object of the present invention to provide a method of making expanded multilayer integral geogrids in which the expanded inner layer is produced by first dispersing a particulate filler in a layer of the multilayer polymer starting sheet, and then biaxially orienting the multilayer polymer starting sheet so as to stretch the dispersion of particulate filler and create a distribution of voids as the particulate filler partially separates from the polymeric layer material.

And, still another object of the present invention is to provide a method of strengthening a mass of particulate material that includes embedding in the mass of particulate material an expanded multilayer integral geogrid having a repeating geometric pattern of partially oriented junctions interconnecting oriented strands and openings and having an expanded inner layer.

And, yet another object of the present invention, in addition to the structural and performance enhancements associated therewith, is to provide significant economic benefits for using the inventive multilayer integral geogrids, i.e., by achieving a higher aspect ratio at a same cost, or by achieving a same aspect ratio at a lower cost. The numerous advantages associated with the expanded multilayer integral geogrid according to the present invention are varied in nature.

By virtue of the expanded multilayer integral geogrids of the present invention having not only a multilayer construction, but with at least one inner layer thereof having a structure that is expanded relative to at least one other layer of the multiple layers as a result of the distribution of voids therein, the geogrids provide for increased layer compressibility under load.

Further, the multilayer nature of the expanded multilayer integral geogrids of the present invention impart overall greater stiffness to the integral geogrid relative to that of prior monolayer integral geogrids. In addition, by virtue of the expanded inner layer, the expanded multilayer integral geogrids of the present invention are characterized by a compliant, i.e., initial give or flexibility, that leads to better compaction and higher density, yet with a final horizontal aggregate geogrid composite stiffness that is greater as a result of the initial give.

In addition, the expanded multilayer integral geogrids of the present invention provide higher aspect ratios on all strands compared to those of prior integral geogrids. Because the high aspect ratio of the integral geogrids of the present invention increases aggregate interlock, the expanded multilayer integral geogrids of the present invention can better accommodate the varying aspect ratios of aggregate.

Even more specifically, with regard to the higher aspect ratio achievable with the expanded multilayer integral geogrids of the present invention, the higher aspect ratio provides at least the following distinct and important benefits. First, if an integral geogrid having strands with a higher aspect ratio is desired, the expanded layer according to the present invention can provide that higher aspect ratio while using the same overall polymer content (i.e., "amount" of polymer) as a similarly configured integral geogrid not having an expanded layer. Second, if an integral geogrid having strands with a same aspect ratio as a similarly configured integral geogrid is desired, the expanded layer according to the present invention can provide that same aspect ratio while using less overall polymer content (i.e., "amount" of polymer). Accordingly, the expanded multilayer integral geogrids of the present invention, in addition to the structural and performance enhancements associated therewith, can provide significant economic benefits, i.e., achieving a higher aspect ratio at a same cost, or achieving a same aspect ratio at a lower cost.

In summary, by virtue of the void-containing expanded inner layer, the expanded multilayer integral geogrids of the present invention provide for both increased layer compressibility under load and increased strength as an aggregate reinforcement, while also providing economic benefits for their use based solely on the amount of polymer used.

These together with other objects and advantages which will become subsequently apparent reside in the details of construction and operation as more fully hereinafter described, reference being had to the accompanying drawings forming a part hereof, wherein like reference numbers refer to like parts throughout. The accompanying drawings are intended to illustrate the invention, but are not necessarily to scale.

BRIEF DESCRIPTION OF THE DRAWINGS

FIG. 17 presents a table comparing benefits of the expanded multilayer integral geogrid of the present invention versus a monolayer geogrid not having an expanded layer.

DETAILED DESCRIPTION OF THE PREFERRED EMBODIMENTS

Figure 1:
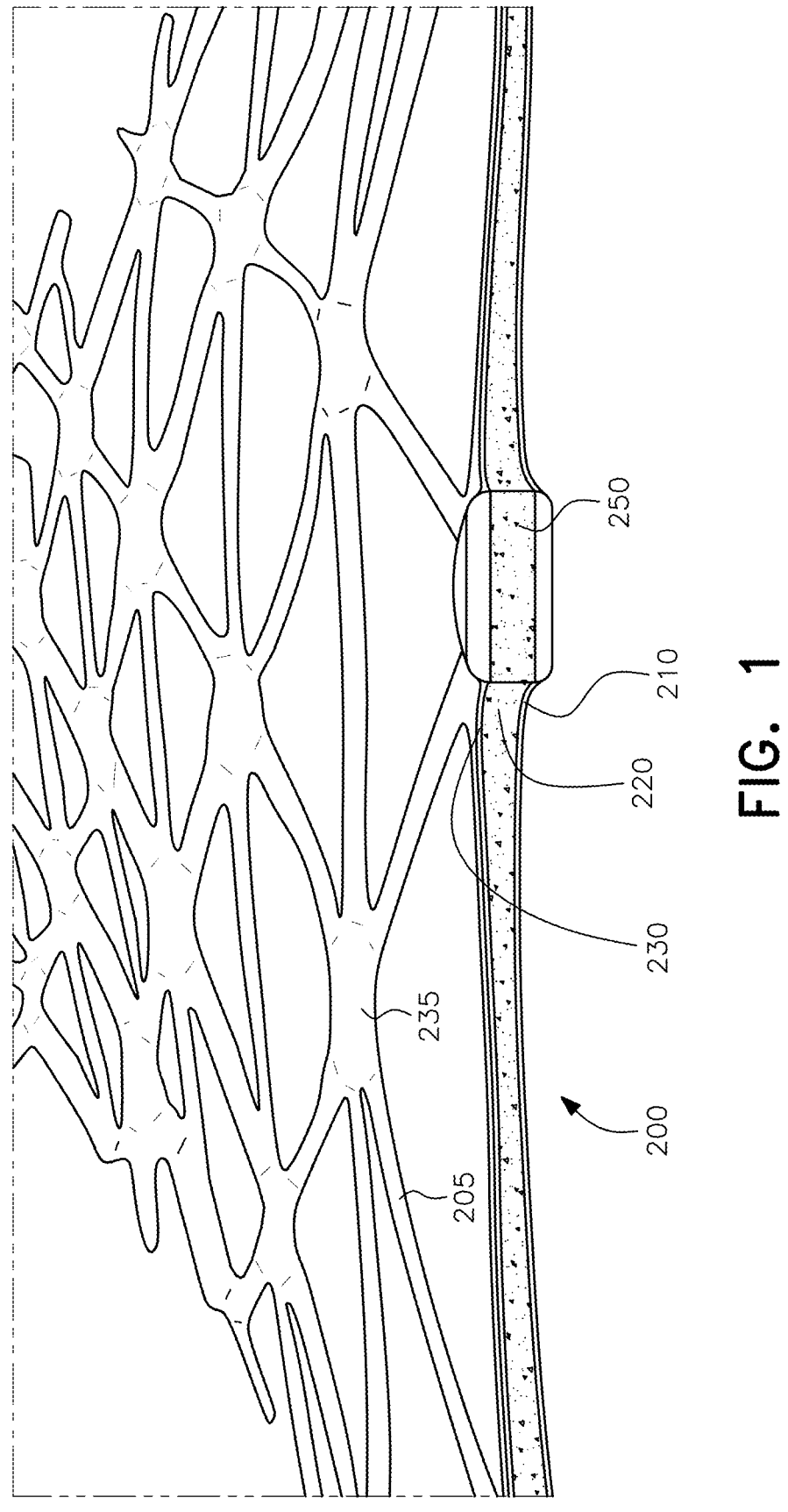
FIG. 1 is a perspective cross-sectional view of a section of a triaxial expanded multilayer integral geogrid according to one embodiment of the present invention.

Although only preferred embodiments of the invention are explained in detail, it is to be understood that the invention is not limited in its scope to the details of construction and arrangement of components set forth in the following description or illustrated in the drawings. As described hereinafter, the present invention is capable of other embodiments and of being practiced or carried out in various ways.

Also, in describing the preferred embodiments, terminology will be resorted to for the sake of clarity. It is intended that each term contemplates its broadest meaning as understood by those skilled in the art, and includes all technical equivalents which operate in a similar manner to accomplish a similar purpose.

And, as used herein, the terms "coextruded," "coextruding," and "coextrusion" are used according to their commonly accepted definition, i.e., pertaining to a single-step process starting with two or more polymeric materials that are simultaneously extruded and shaped in a single die to form a multilayer sheet.

As also used herein, the terms "laminated," "laminating," and "lamination" are used according to their commonly accepted definition, i.e., pertaining to a process starting with two or more polymeric material sheets that are produced individually and then joined to each other to form a multilayer sheet of three or more layers.

The present invention is directed to integral geogrids having a multilayer construction, preferably of three layers or more, with at least one inner layer thereof having a structure that is expanded relative to at least one other layer of the multiple layers, i.e., an "expanded multilayer integral geogrid" or "expanded multilayer integral geogrids." By virtue of the expanded inner layer structure, the expanded multilayer integral geogrids provide for increased layer compressibility under load, and other desirable characteristics.

More specifically, the expanded multilayer integral geogrids include a plurality of oriented multilayer strands interconnected by partially oriented multilayer junctions and having an array of openings therebetween, with each of the oriented multilayer strands and each of the partially oriented multilayer junctions having a plurality of layers including an inner layer with a structure that is expanded relative to at least one other layer of said plurality of layers, and with the plurality of layers being in contact both along each of the oriented multilayer strands and each of the partially oriented multilayer junctions.

Even more specifically, the inner layer having the expanded structure contains a distribution of voids therein. The voids may be associated with a foamed construction of the layer, or may be associated with a particulate filler that is distributed throughout the layer in order to create the expansion of the layer.

And, as also used herein, the term "expandable" when used to describe the aforementioned inner layer refers to the ability of the inner layer to expand during the formation of the expanded multilayer integral geogrid. The term "expanded" when used to describe the aforementioned inner layer means the structure of the inner layer after the formation of the expanded multilayer integral geogrid via stretching to orient the geogrid, including the associated enlargement of the voids present in the expandable inner layer.

Further, the multilayer construction may include layers that are coextruded, or layers that are laminated. The expansion of the expanded inner layer may occur during extrusion/lamination or stretching/orientation, or both. And, the resulting expanded multilayer integral geogrid having the plurality of oriented multilayer strands interconnected by partially oriented multilayer junctions and having an array of openings therebetween may be configured in any of a variety of repeating geometric patterns described herein.

As shown in FIG. 1, an expanded multilayer integral geogrid 200 according to one embodiment of the present invention (here a triaxial integral geogrid) includes, disposed between a first outer layer 210 and a second outer layer 230, a third layer, i.e., an expanded inner layer 220.

As indicated above, the expanded inner layer 220 contains a distribution of voids 250 therein. The voids 250 may be associated with a foamed construction of the expanded inner layer 220, or may be associated with a particulate filler that is distributed in the expanded inner layer 220 in order to create the expansion of the inner layer.

According to the foamed embodiment of the expanded inner layer 220, the instant invention can include the use of a foaming agent to provide an expandable inner layer 220, i.e., having a void-containing foamed structure. That is, according to an embodiment of the invention that produces the layers of the integral geogrid via coextrusion (discussed below), one possible process is to mix a chemical foaming agent with the polymer that is extruded to form the expandable inner layer 220. The heat that is generated to melt the polymer decomposes the chemical foaming agent, which results in the liberation of a gas. The gas is then dispersed in the polymer melt, and expands upon exiting the die. As a result, the expandable inner layer 220 is foamed. Similar to chemical foaming, the injection of a gas in the one or more expandable layers is also considered a foaming process according to this embodiment of the invention.

More specifically, the foam additive, i.e., the foaming agent, preferably constitutes from 0.5% to 2% by weight of the expanded layer, and more preferably, constitutes from 0.75% to 1.25% by weight of the expanded layer. In general, as noted above, the foam additive creates voids during the extrusion process by producing volatile gases. The volume of voids is controlled by the percentage of foam additive, the melt temperature, and the control of pressure along the polymer extrusion pathway. Furthermore, a high melt strength polymer is used to properly control the void shape and the void size during the extrusion process.

According to the particulate filler embodiment of the expanded inner layer 220, the instant invention employs a dispersion of a particulate filler to provide an expandable inner layer 220, i.e., having a void-containing structure. The inclusion of such a particulate filler in the expanded inner layer 220 creates a product having a thicker, i.e., loftier, profile, which can lead to enhanced performance of the integral geogrid in certain service applications. Depending upon the service application in which the expanded multilayer integral geogrid is to be employed, such particulate fillers, may include, for example, one or more of $CaCO_3$ (calcium carbonate), hydrous magnesium silicates (e.g., talc), $CaSiO_3$ (wollastonite), calcium sulphates (e.g., gypsum), diatomaceous earth, titanium dioxide, nano-fillers, multi-wall carbon nanotube ("MWCNT"), single wall carbon nanotube ("SWCNT"), natural and synthetic fibers (e.g., glass fibers, metal fibers), dolomite, silica, mica, and aluminum hydrate.

More specifically, the particulate filler preferably constitutes from 10% to 40% by weight of the expanded layer, and more preferably, constitutes from 15% to 25% by weight of the expanded layer. The particulate filler embodiment of the invention creates voids not during the extrusion process per se, but rather during the orienting (stretching) of the starting sheet that results in the integral geogrid. That is, the stretching process creates voids via cavitation behind the individual particles of the particulate filler i.e., as shear forces act on the polymer matrix.

According to both the foamed embodiment and the particulate filler embodiment, the material of construction of the first outer layer (here, 210) and the material of construction of the second outer layer (here, 230) may be the same as each other, or may be different from one another, although the same material is preferred. In general, the material of construction of the expandable inner layer 220 is different from the material of construction of both the first outer layer 210 and the material of construction of the second outer layer 230.

Contemplated embodiments of the present invention include those in which one or more of the foamed layers are used in conjunction with one or more layers that include the particulate filler.

Figure 2:
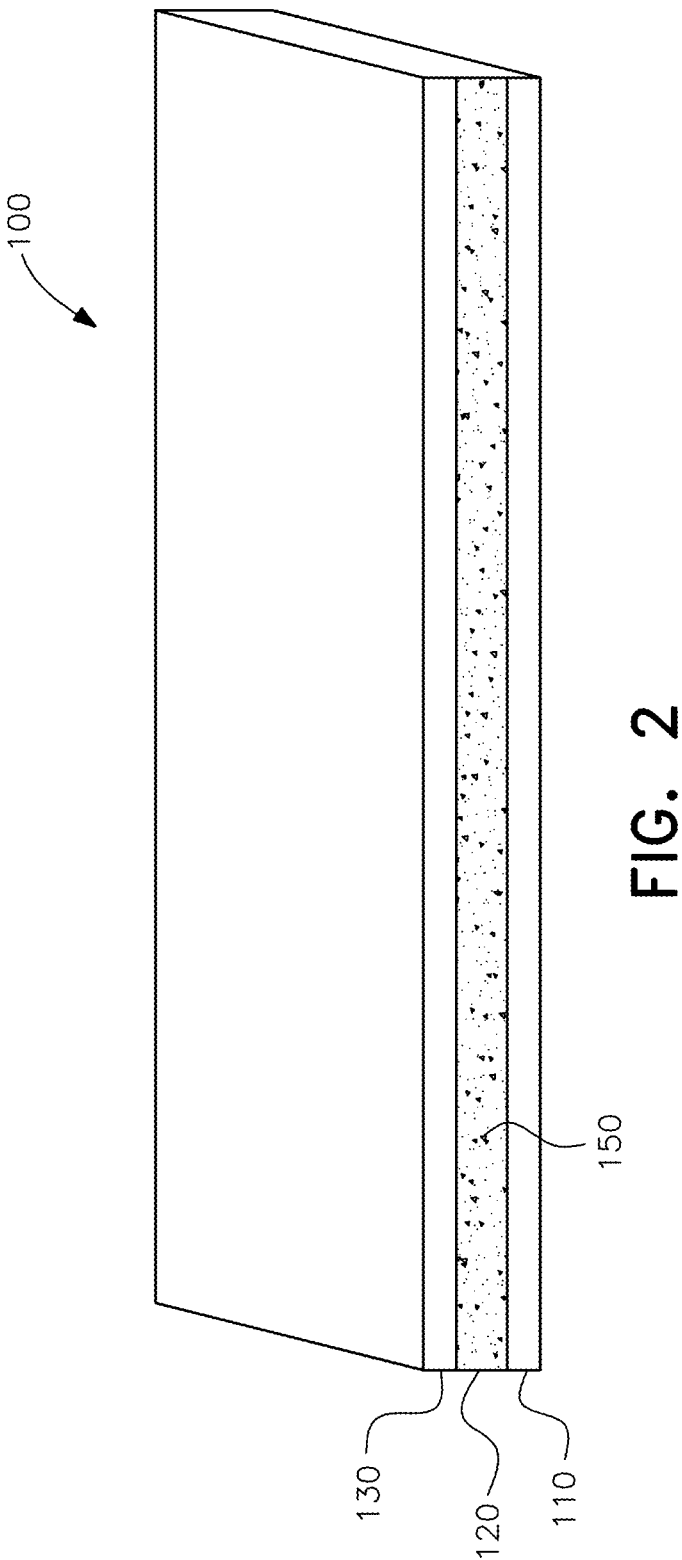
FIG. 2 illustrates a uniplanar multilayer polymer starting sheet for the triaxial expanded multilayer integral geogrid shown in FIG. 1, before holes or depressions are formed therein.

FIG. 2 illustrates a uniplanar multilayer polymer starting sheet 100 for the expanded multilayer integral geogrid 200 shown in FIG. 1, before holes or depressions are formed therein.

As shown in FIG. 2, the multilayer polymer starting sheet 100 is a three-layer sheet embodiment of the invention. That is, preferably, sheet 100 includes a first outer layer 110, a second outer layer 130, and an inner layer 120, which is the expandable layer containing voids 150. The first outer layer 110 and the second outer layer 130 are arranged on opposite planar surfaces of inner layer 120, preferably in a uniplanar or substantially uniplanar configuration. Further, while the three-layer configuration of sheet 100 is shown for purposes of illustration, the invention contemplates the use of a sheet having multiple layers arranged in various configurations, multiple layers having various combinations of thicknesses, and multiple layers having various materials of construction, all as dictated by the particular application in which the integral geogrid is to be employed. For example, while the three-layer configuration of sheet 100 is shown for purposes of illustration, the invention also contemplates the use of sheets having more than three layers. In general, the layer configuration, the layer thicknesses, and the materials of construction of the layers are selected to provide not only ease of fabrication of the integral geogrid, but also an integral geogrid having the desired degree of compressibility, stiffness, and other performance properties.

As described above, the multilayer polymer starting sheet 100 used as the starting material for an expanded multilayer integral geogrid according to the present invention is preferably through-punched, although it may be possible to use depressions formed therein instead. According to the embodiment in which depressions are formed in the sheet, the depressions are provided on each side of the sheet 100, i.e., on both the top and the bottom of the sheet. Further, the depressions extend into each layer of the multilayer sheet.

According to a preferred embodiment of the invention, the overall thickness of the multilayer polymer starting sheet 100 is from about 2 mm to about 12 mm and, according to a more preferred embodiment of the invention, the overall thickness of the sheet 100 is from about 2 mm to about 6 mm.

With regard to the individual thicknesses of the sheet layers, according to a preferred embodiment of the invention, the thickness of the first outer layer 110 is from about 0.5 mm to about 4.5 mm, the thickness of the expandable inner layer 120 is from about 1 mm to about 9 mm, and the thickness of the second outer layer 130 is from about 0.5 mm to about 4.5 mm, keeping in mind that the overall thickness of the starting sheet 100 is from about 2 mm to about 12 mm. And, according to a more preferred embodiment of the invention, the thickness of the first outer layer 110 is from about 0.5 mm to about 2 mm, the thickness of the expandable inner layer 120 is from about 2 mm to about 5 mm, and the thickness of the second outer layer 130 is from about 0.5 mm to about 2 mm.

In general, the material of construction of the first outer layer 110, the expandable inner layer 120, and the second outer layer 130 may be the same as each other, or may be different from one another. Preferably, the material of construction of the first outer layer 110 and the material of construction of the second outer layer 130 are the same as each other. More preferably, material of construction of the expandable inner layer 120 is different from the material of construction of both the first outer layer 110 and the material of construction of the second outer layer 130.

And, in general, the layers of the sheet are polymeric in nature. For example, the materials of construction may include high molecular weight polyolefins, and broad specification polymers. Further, the polymeric materials may be virgin stock, or may be recycled materials, such as, for example, post-industrial or post-consumer recycled polymeric materials. And, the use of one or more polymeric layers having a lower cost than that of the aforementioned high molecular weight polyolefins and broad specification polymers is also contemplated.

According to a preferred embodiment of the invention, the material of construction of the first outer layer 110 and the second outer layer 130 is a high molecular weight polyolefin, such as, for example, a polypropylene ("PP"). And, according to the same preferred embodiment, the material of construction of the expandable inner layer 120 is a broad specification polymer, such as, for example, a virgin PP, or a recycled PP, such as, for example, a post-industrial PP or other recycled PP. However, depending upon the particular application of the integral geogrid, polymeric components having a material of construction other than polypropylene may be included in the multilayer polymer starting sheet 100.

According to the present invention, the multilayer polymer starting sheet 100 may be produced by coextrusion of the layers, such as is disclosed in the aforementioned '960 application, or by lamination of separately produced layers.

Figure 3:
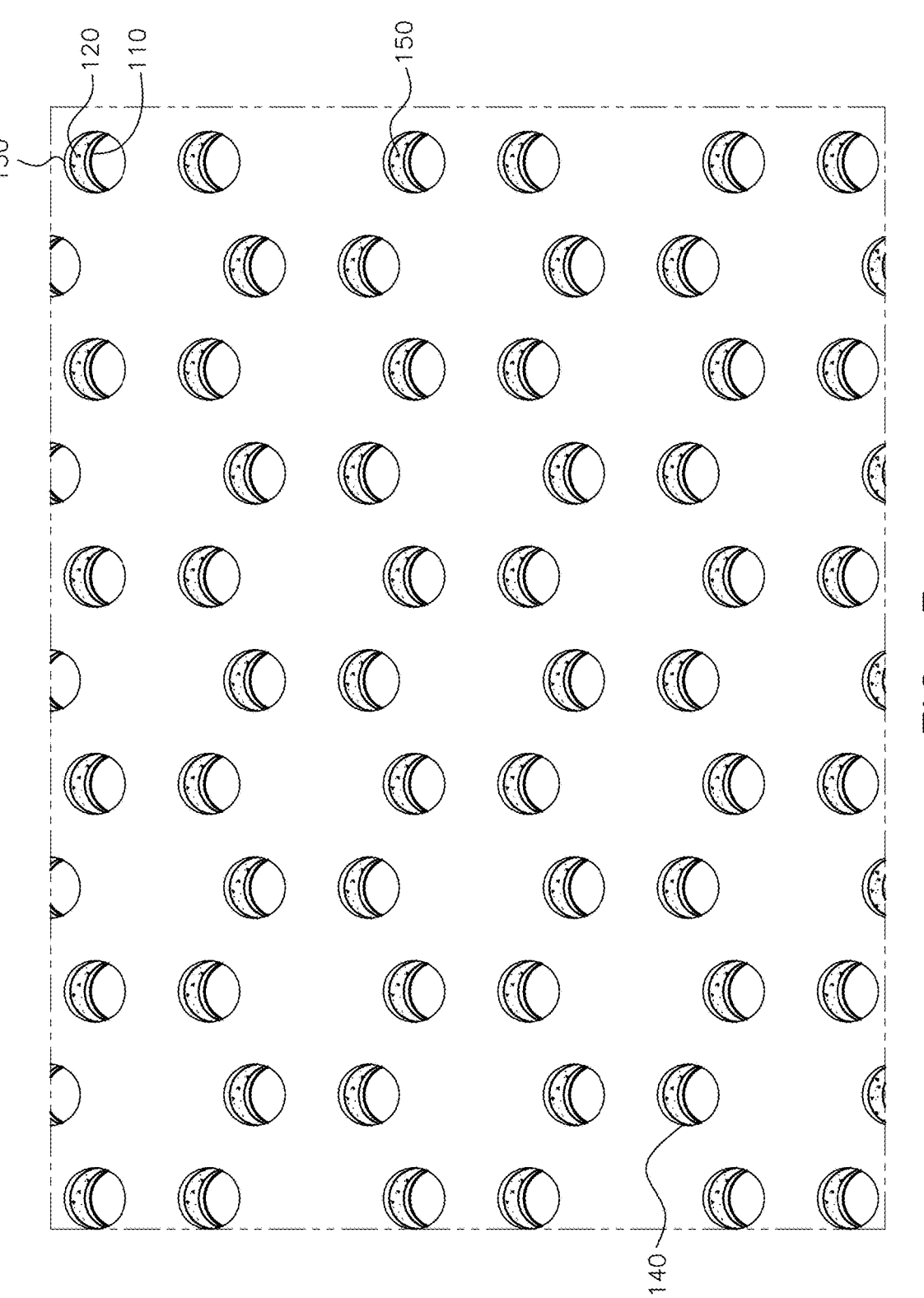
FIG. 3 is a top perspective plan view of the starting sheet shown in FIG. 2 that has holes punched therein for forming a triaxial expanded multilayer integral geogrid.
Figure 4:
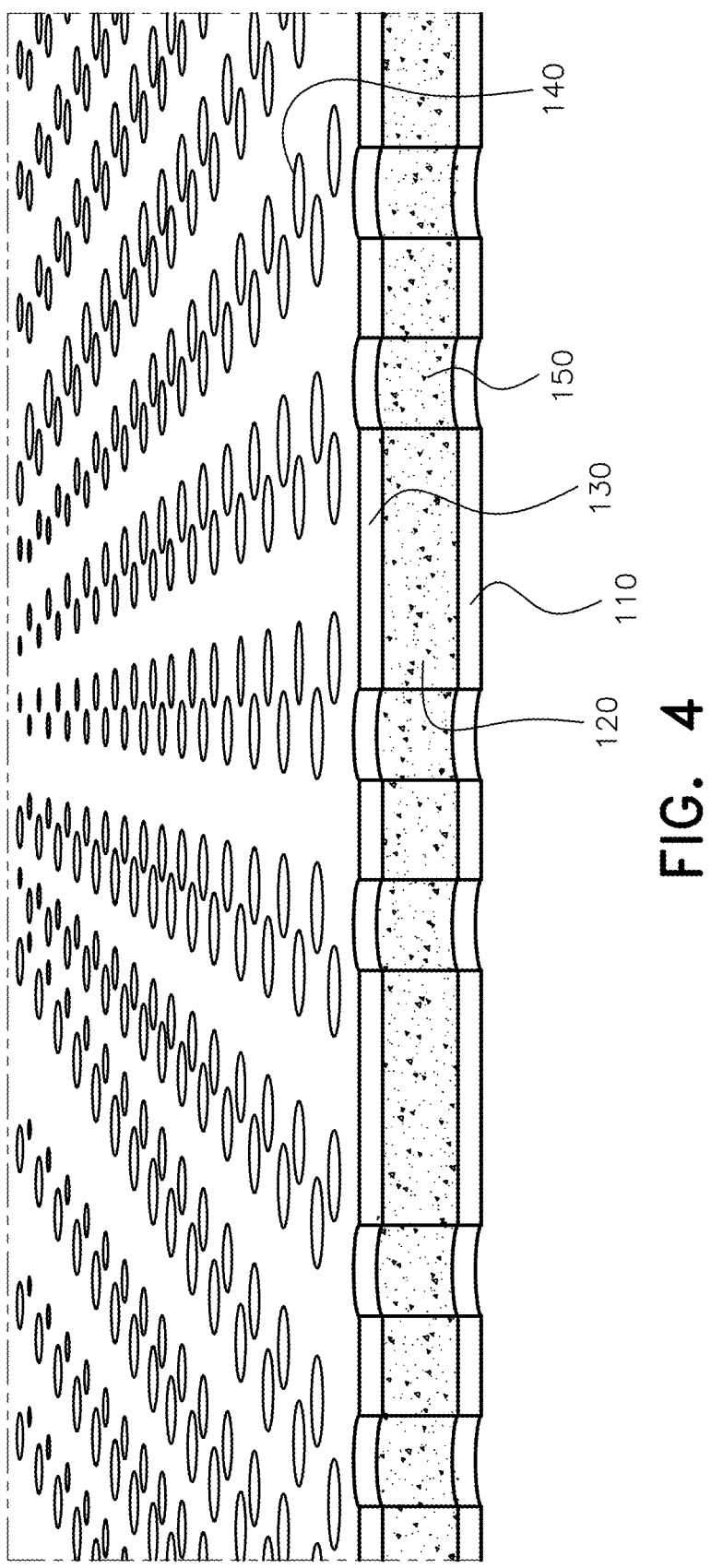
FIG. 4 is a perspective cross-sectional view of a section of the starting sheet shown in FIG. 3.

FIG. 3 is a top perspective plan view of the multilayer polymer starting sheet 100 shown in FIG. 2 that has holes 140 punched therein for forming the triaxial expanded multilayer integral geogrid 200 shown in FIG. 1. FIG. 4 is a perspective cross-sectional view of a section of the multilayer polymer starting sheet 100 shown in FIG. 3.

The size and spacing of the holes 140 are as disclosed in the Walsh '112 patent. The triaxial expanded multilayer integral geogrid 200 includes highly oriented strands 205 and partially oriented junctions 235, also as disclosed in the Walsh '112 patent. The second outer or upper layer 130 of the multilayer polymer starting sheet 100 has been stretched and oriented into the upper layer 230 of the strands 205 and junctions 235. Similarly, the first outer or lower layer 110 of the multilayer polymer starting sheet 100 has been stretched and oriented into the lower or underneath layer 210 of the strands 205 and junctions 235. As the second layer 130 and first layer 110 are being stretched and oriented, the second or expanded inner layer 120 is also being stretched and oriented into middle layer 220 of both the strands 205 and junctions 235.

As indicated above, while the three-layer configuration of multilayer polymer starting sheet 100 has been shown for purposes of illustration, the invention also contemplates the use of starting sheets having more than three layers.

Figure 5:
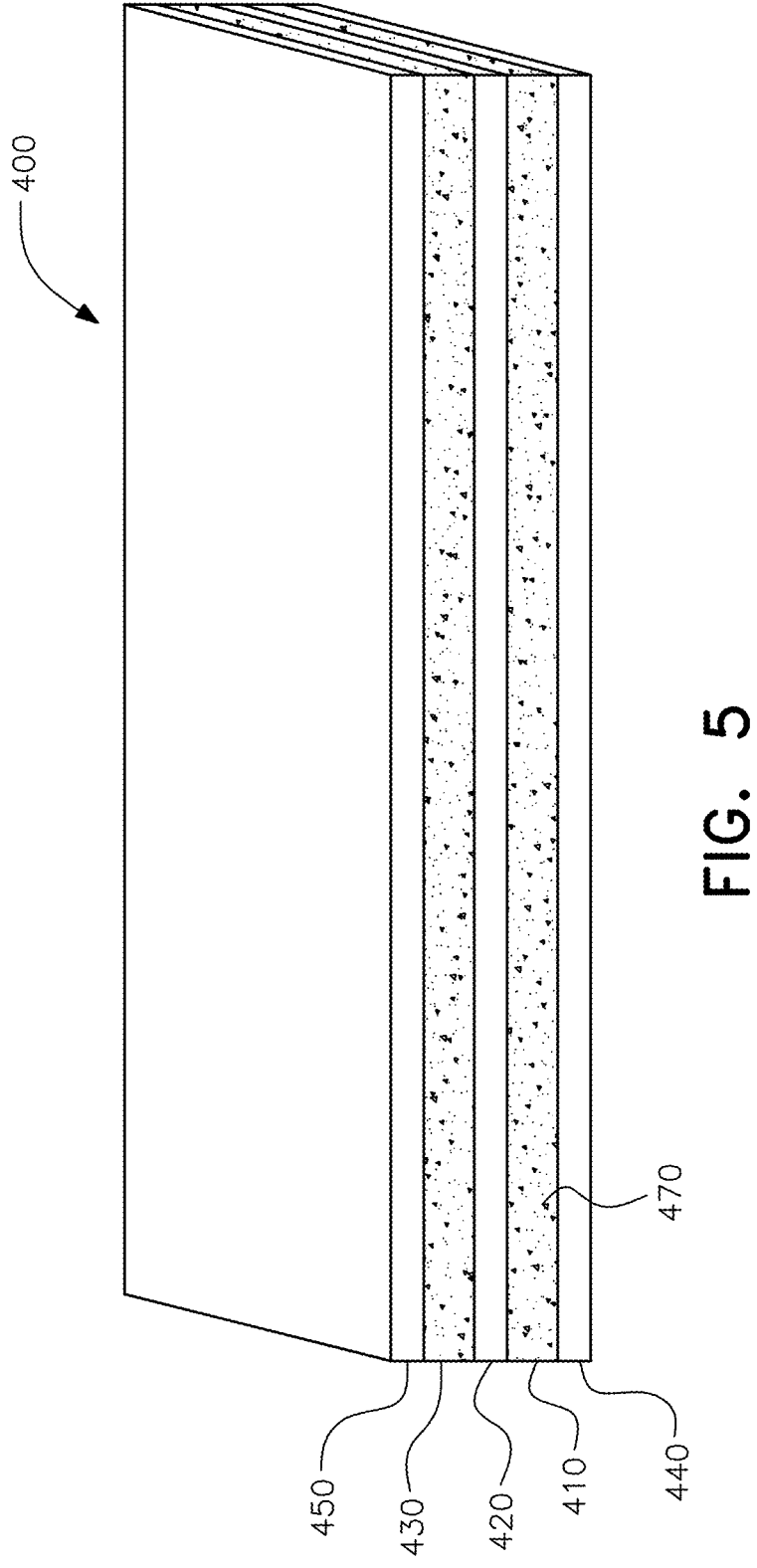
FIG. 5 illustrates a uniplanar multilayer polymer starting sheet for a triaxial expanded multilayer integral geogrid, before holes or depressions are formed therein according to another embodiment of the present invention.

For example, the starting sheet can be a five-layer configuration, such as multilayer polymer starting sheet 400 shown in FIG. 5. Sheet 400 includes a middle layer 420, a first expanded inner layer 410, a second expanded inner layer 430, a first outer layer 440, and a second outer layer 450. The first expanded inner layer 410 and the second expanded inner layer 430 are arranged on opposite planar surfaces of middle layer 420, preferably in a uniplanar or substantially uniplanar configuration. The first outer layer 440 and the second outer layer 450 are arranged on opposite planar surfaces of, respectively, first expanded inner layer 410 and second expanded inner layer 430, preferably in a uniplanar or substantially uniplanar configuration.

In the particular embodiment of the invention shown in FIG. 5, the multilayer polymer starting sheet 400 is made by coextruding or laminating a first material that forms the middle layer 420, a second material that forms the first expanded inner layer 410, a third material that forms the second expanded inner layer 430, a fourth material that forms the first outer layer 440, and a fifth material that forms the second outer layer 450.

In general, the material of construction of the middle layer 420, the first expanded inner layer 410, the second expanded inner layer 430, the first outer layer 440, and the second outer layer 450 may be the same as each other, or may be different from one another. For example, the middle layer 420 may have a first material of construction, the first expanded inner layer 410 and the second expanded inner layer 430 may have a second material of construction, and the first outer layer 440 and the second outer layer 450 may have a third material of construction. In summary, depending upon the particular service application in which the expanded multilayer integral geogrid made from the sheet 400 is to be employed, various combinations of materials of construction for the above-described five layers may be used.

Figure 6:
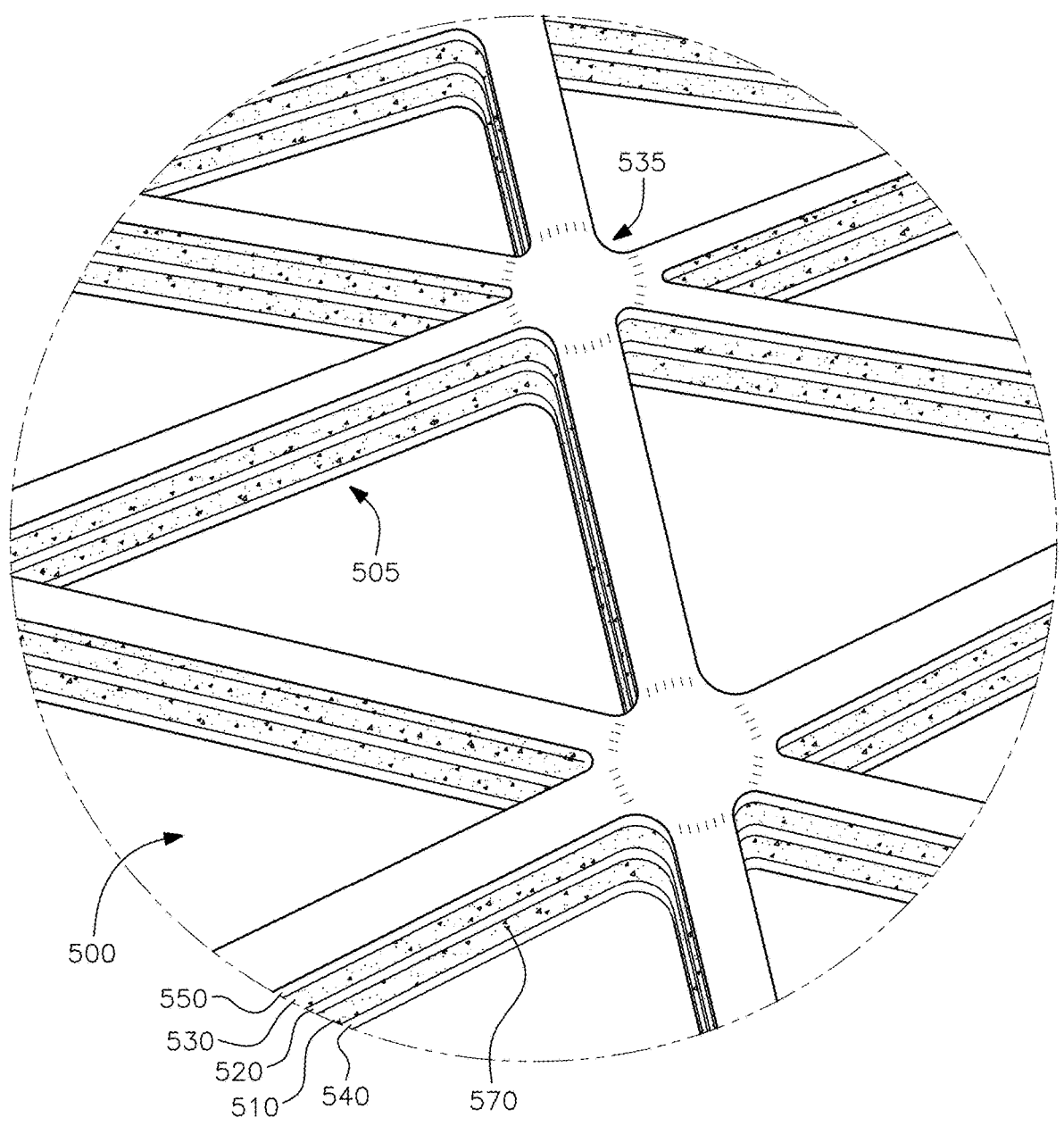
FIG. 6 is a perspective cross-sectional view of a section of a triaxial multilayer integral geogrid associated with the starting sheet shown in FIG. 5.

FIG. 6 is a perspective view of a section of a triaxial expanded multilayer integral geogrid 500 associated with the multilayer polymer starting sheet 400 shown in FIG. 5. The triaxial expanded multilayer integral geogrid 500 includes highly oriented strands 505 and partially oriented junctions 535. After holes have been punched in sheet 400, the first outer layer 440 and the second outer layer 450 of sheet 400 have been stretched and oriented into, respectively, the first outer layer 540 and the second outer layer 550 of the strands 505 and junctions 535. Similarly, the first expanded inner layer 410 and the second expanded inner layer 430 of sheet 400 have been stretched and oriented into, respectively, the first expanded inner layer 510 and the second expanded inner layer 530 of the strands 505 and junctions 535. And, as the first outer layer 440 and the second outer layer 450, and the first expanded inner layer 410 and the second expanded inner layer 430 are being stretched and oriented, the middle layer 420 is also being stretched and oriented into middle layer 520 of both the strands 505 and junctions 535.

And again, as with multilayer polymer starting sheet 100 (i.e., the three-layer embodiment), multilayer polymer starting sheet 400 having five layers may have expanded layers that are foamed or have particulate filler, and may be formed by coextrusion or lamination.

Now, turning to the geometry of the expanded multilayer integral geogrids, the invention contemplates at least three general categories: triangular (such as "triaxial"), rectangular, and hexagonal.

The geometry of the triaxial expanded multilayer integral geogrid 200 is as shown in FIGS. 1 and 6.

Figure 7:
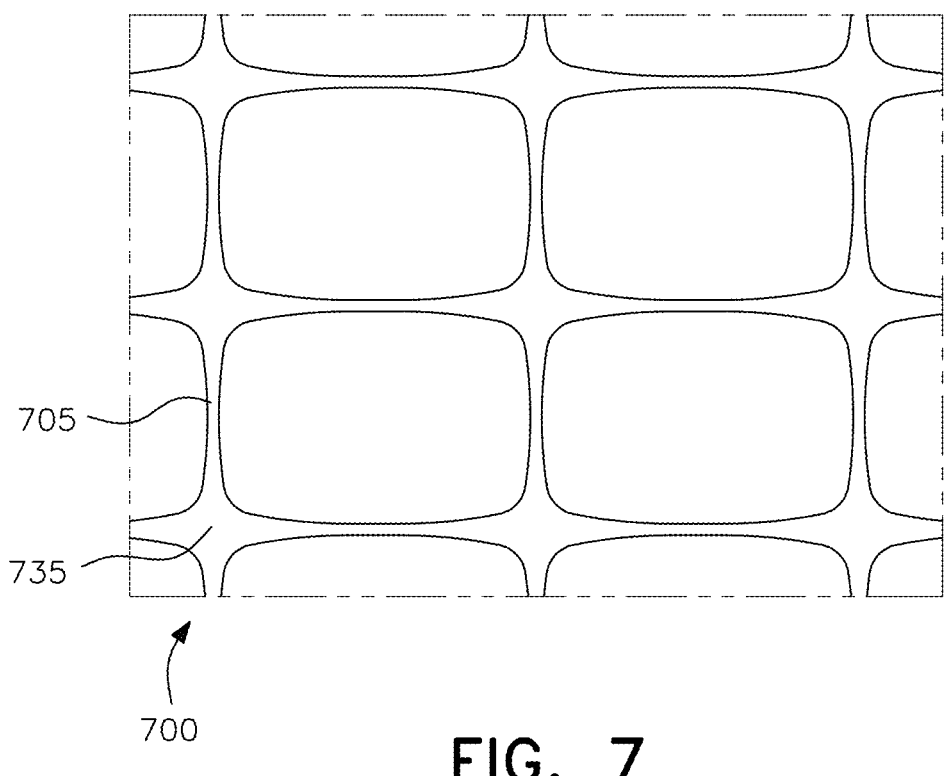
FIG. 7 is a plan view of a rectangular expanded multilayer integral geogrid according to still another embodiment of the present invention.
Figure 8:
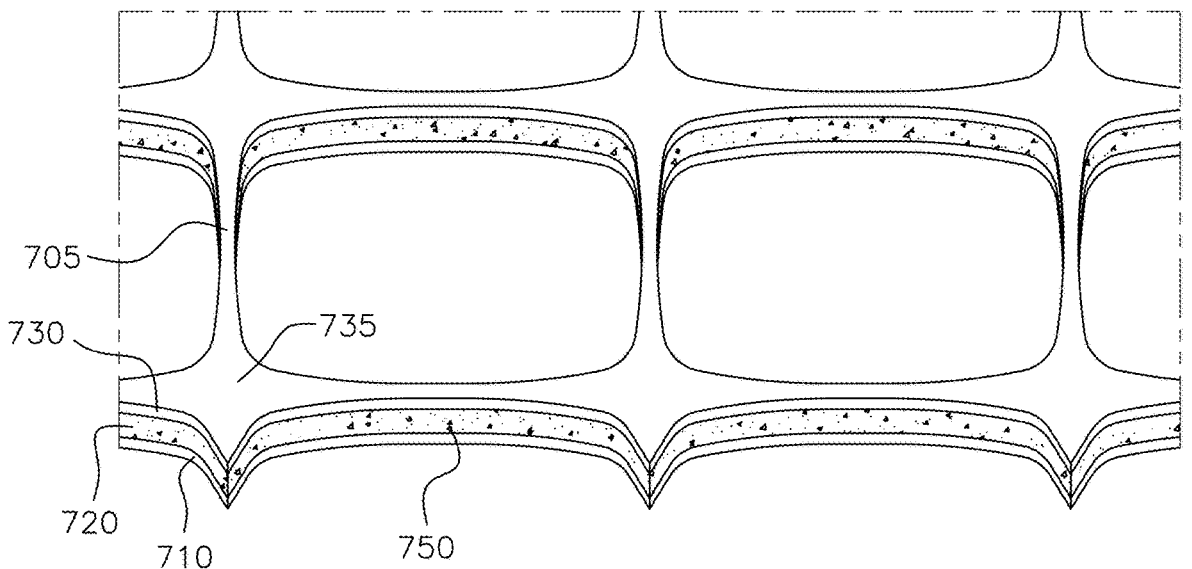
FIG. 8 is a perspective view of the rectangular expanded multilayer integral geogrid shown in FIG. 7.

The geometry of the rectangular expanded multilayer integral geogrid 700 is shown in FIG. 7. The rectangular expanded multilayer integral geogrid 700 includes highly oriented strands 705 and partially oriented junctions 735. As shown in FIG. 8, the rectangular expanded multilayer integral geogrid 700 includes, disposed between a first outer layer 710 and a second outer layer 730, a third layer, i.e., an expanded inner layer 720. As with the triangular geometry described herein, the expanded inner layer 720 contains a distribution of voids 750 therein. The voids 750 may be associated with a foamed construction of the expanded inner layer 720, or may be associated with a particulate filler that is distributed in the expanded inner layer 720 in order to create the expansion of the inner layer.

The second outer or upper layer 730 of a multilayer polymer starting sheet 600 (described below) has been stretched and oriented into the upper layer 730 of the strands 705 and junctions 735. Similarly, the first outer or lower layer 710 of the multilayer polymer starting sheet 600 has been stretched and oriented into the lower or underneath layer 710 of the strands 705 and junctions 735. As the second layer 730 and first layer 710 are being stretched and oriented, the second or expanded inner layer 720 is also being stretched and oriented into middle layer 720 of both the strands 705 and junctions 735.

Figure 9:
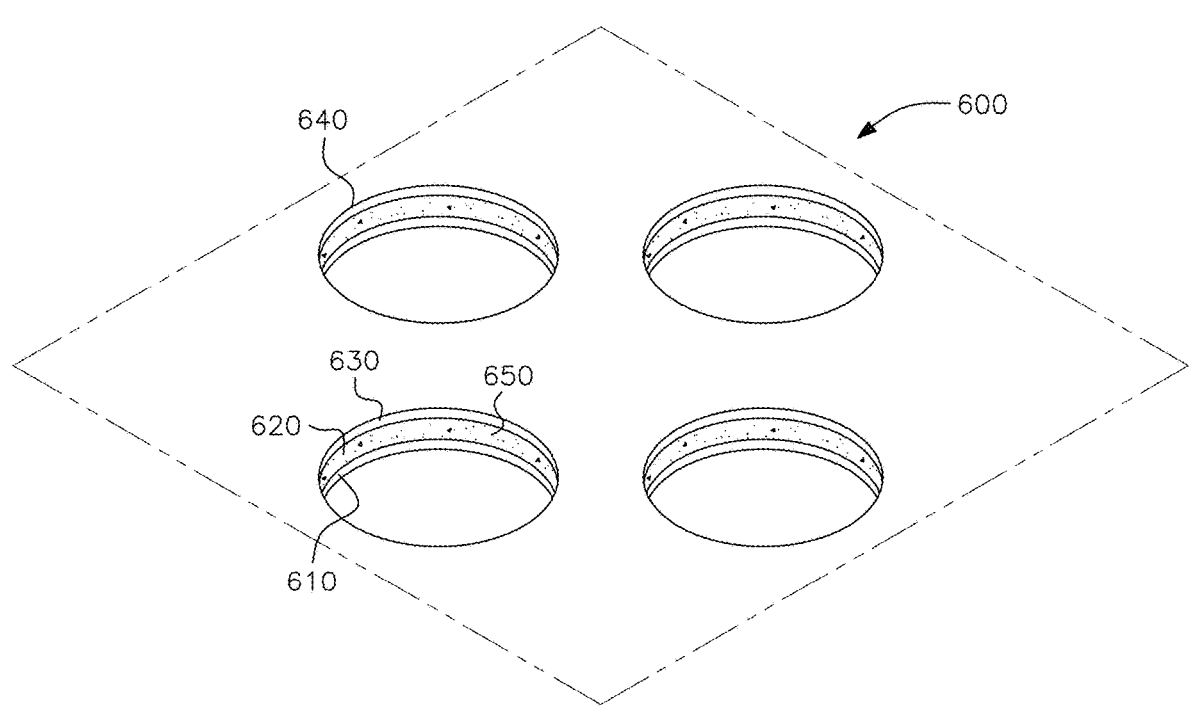
FIG. 9 is a top perspective plan view of a starting sheet having holes or depressions formed therein for forming the rectangular expanded multilayer integral geogrid shown in FIG. 7.

FIG. 9 is a top perspective plan view of a multilayer polymer starting sheet 600 that has holes 640 punched therein for forming the rectangular expanded multilayer integral geogrid 700 shown in FIGS. 7 and 8. The multilayer polymer starting sheet 600 includes, disposed between a first outer layer 610 and a second outer layer 630, a third layer, i.e., an expandable inner layer 620. As with the triangular geometry described herein, the expandable inner layer 620 contains a distribution of voids 650 therein.

And, as with the triangular embodiment of the expanded multilayer integral geogrid, the rectangular embodiment of the expanded multilayer integral geogrid has an expanded layer that is either foamed or contains a particulate filler. And, the starting sheet of the rectangular embodiment of the expanded multilayer integral geogrid is the same as previously disclosed herein for the triangular embodiment and may have either a coextruded construction or a laminated construction.

Figure 10:
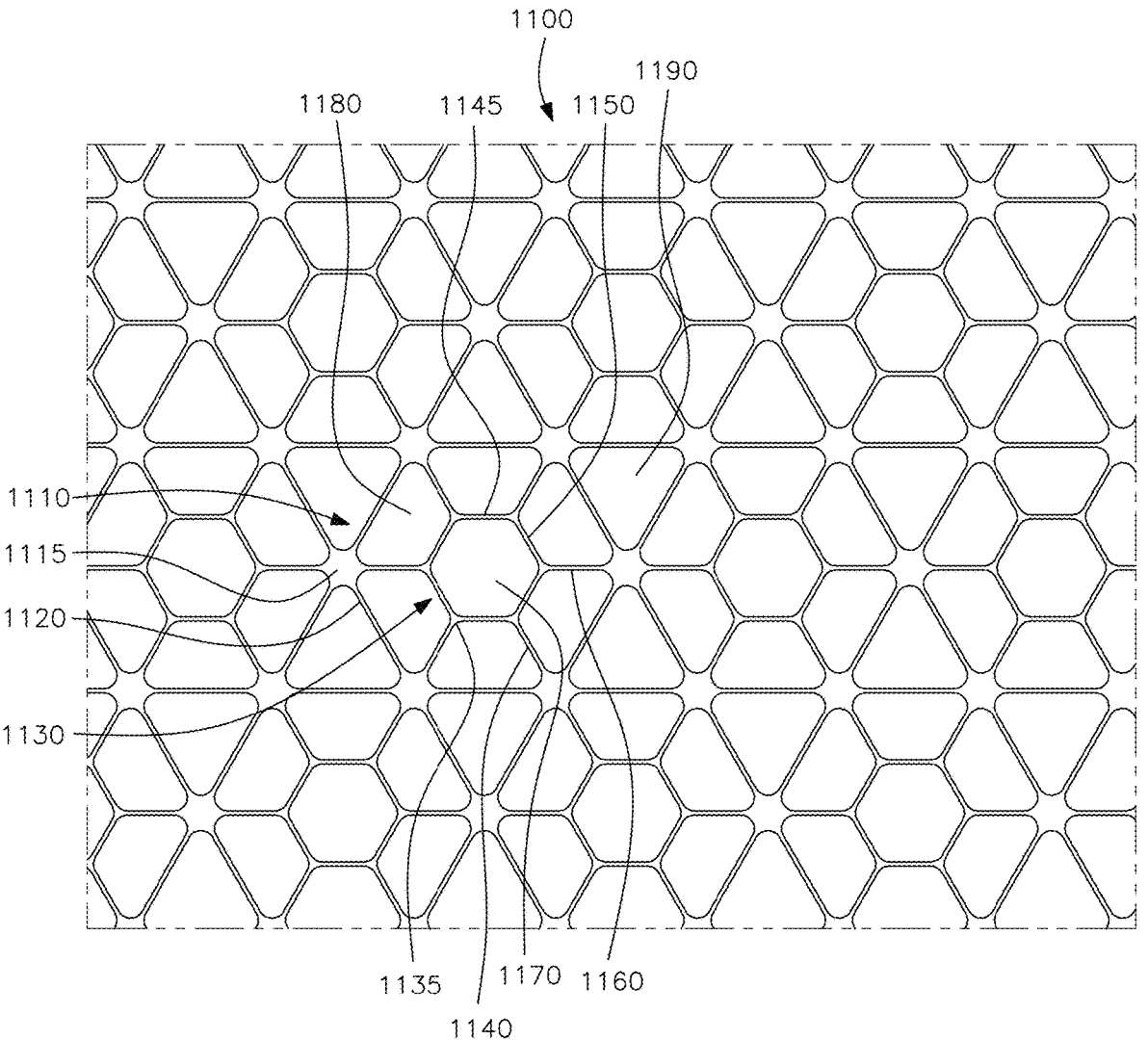
FIG. 10 is a plan view of a hexagonal expanded multilayer integral geogrid according to yet another embodiment of the present invention.
Figure 11:
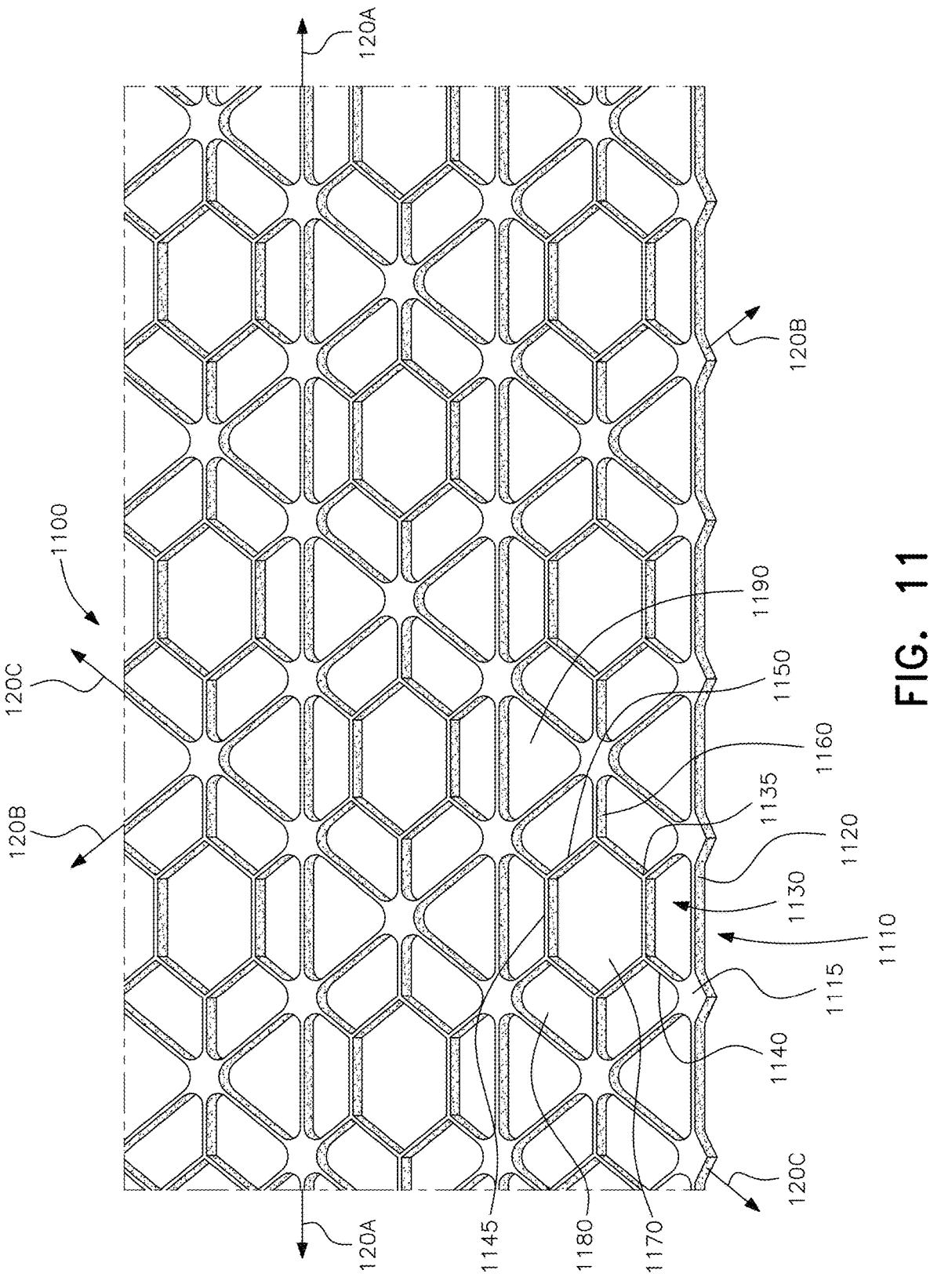
FIG. 11 is a perspective view of the hexagonal expanded multilayer integral geogrid shown in FIG. 10.

And finally, the geometry of the hexagonal expanded multilayer integral geogrid is as shown in FIGS. 10 and 11. An impetus for the development of the hexagonal expanded multilayer integral geogrid is that it is structurally and economically advantageous to produce an integral geogrid having a structure and geometry with the ability to engage with and stabilize a wide variety and range of quality of aggregates that is suitable for the demands of services such as geosynthetic reinforcement or having other properties desirable for particular geosynthetic applications.

To attain the aforementioned ability to engage with and stabilize a greater variety and range of quality of aggregates than geometries associated with prior geogrid structures, while simultaneously providing a variety of degrees of localized out-of-plane and in-plane stiffness, the hexagonal expanded multilayer integral geogrid integral geogrid of the present invention has a repeating pattern of interconnected oriented strands and partially oriented junctions which form a repeating pattern of outer hexagons, each of which supports and surrounds an oriented inner hexagon to define three different shaped openings of a monolayer multi-axial integral geogrid. In addition, to provide additional strength and stability, the geometry of the outer hexagons forms linear strands that extend continuously throughout the entirety of the multi-axial integral geogrid.

As so formed, the inner hexagon is comprised of six oriented strands and is supported by six oriented connecting strands which extend from the partially oriented junctions of the outer hexagon to a respective corner of the inner hexagon to form oriented tri-nodes. The tri-nodes have a much higher level of orientation than the junctions, and tend towards being fully oriented. This configuration creates an inner hexagon that is suspended, i.e., floating, relative to the outer hexagon structure. This structure allows the inner hexagon to shift up or down so as to "float" or flex (deform) relative to the primary plane of the geogrid, during placement and compaction of the aggregate, which enhances the geogrid's ability to engage and stabilize the aggregate. The foregoing geogrid structure is herein referred to as a "repeating floating hexagon within a hexagon pattern."

Referring now to FIGS. 10 and 11, the hexagonal expanded multilayer integral geogrid 1100 includes a plurality of interconnected, oriented strands having an array of openings therein, a repeating floating hexagon within a hexagon pattern of the interconnected, oriented strands and the openings, and including linear strands that extend continuously throughout an entirety of the multi-axial integral geogrid. More specifically, hexagonal expanded multilayer integral geogrid 1100 includes a repeating pattern of floating inner hexagons 1130 within each outer hexagon 1110. The outer hexagon 1110 includes a plurality of outer oriented strands or ribs 1120 interconnected by partially oriented junctions 1115. The inner hexagon 1130 includes a plurality of oriented connecting strands 1145 and 1150 interconnected by tri-nodes 1135, and defines a hexagon-shaped center opening 1170. The outer hexagon 1110 is connected to the smaller inner hexagon 1130 by a plurality of supporting strands 1140 and 1160, which define a plurality of trapezoid-shaped openings 1180. At the center of each pattern of three adjacent outer hexagons 1110 is a triangular shaped opening 1190. As shown, junctions 1115 are much larger than tri-nodes 1135.

As is evident from FIG. 10, another feature of the hexagonal expanded multilayer integral geogrid of the present invention is the linearly continuous nature of the outer strands 1120 of the repeating outer hexagon pattern. That is, the oriented strands 1120 are linearly continuous, via partially oriented junctions 1115, as they extend continuously throughout the entirety of the multi-axial integral geogrid in three different directions separated from each other by approximately 120°, and indicated by arrows 120A, 120B, and 120C in FIGS. 10 and 11. Those skilled in the art will appreciate that different orientations of the same basic geometry are possible after stretching, if an appropriate corresponding rotation of the punched starting sheet geometry is made. The linearly continuous nature of the strands 1120 provides both enhanced strength and in-plane stiffness to the hexagonal expanded multilayer integral geogrid of the present invention.

Preferably, the thickness of the hexagonal expanded multilayer integral geogrid 1100 at its thickest dimension (at junctions 1115) is from about 2 mm to about 9 mm and, more preferably, such thickness of the multi-axial expanded multilayer integral geogrid 1100 is from about 4 mm to about 7 mm.

Figure 12:
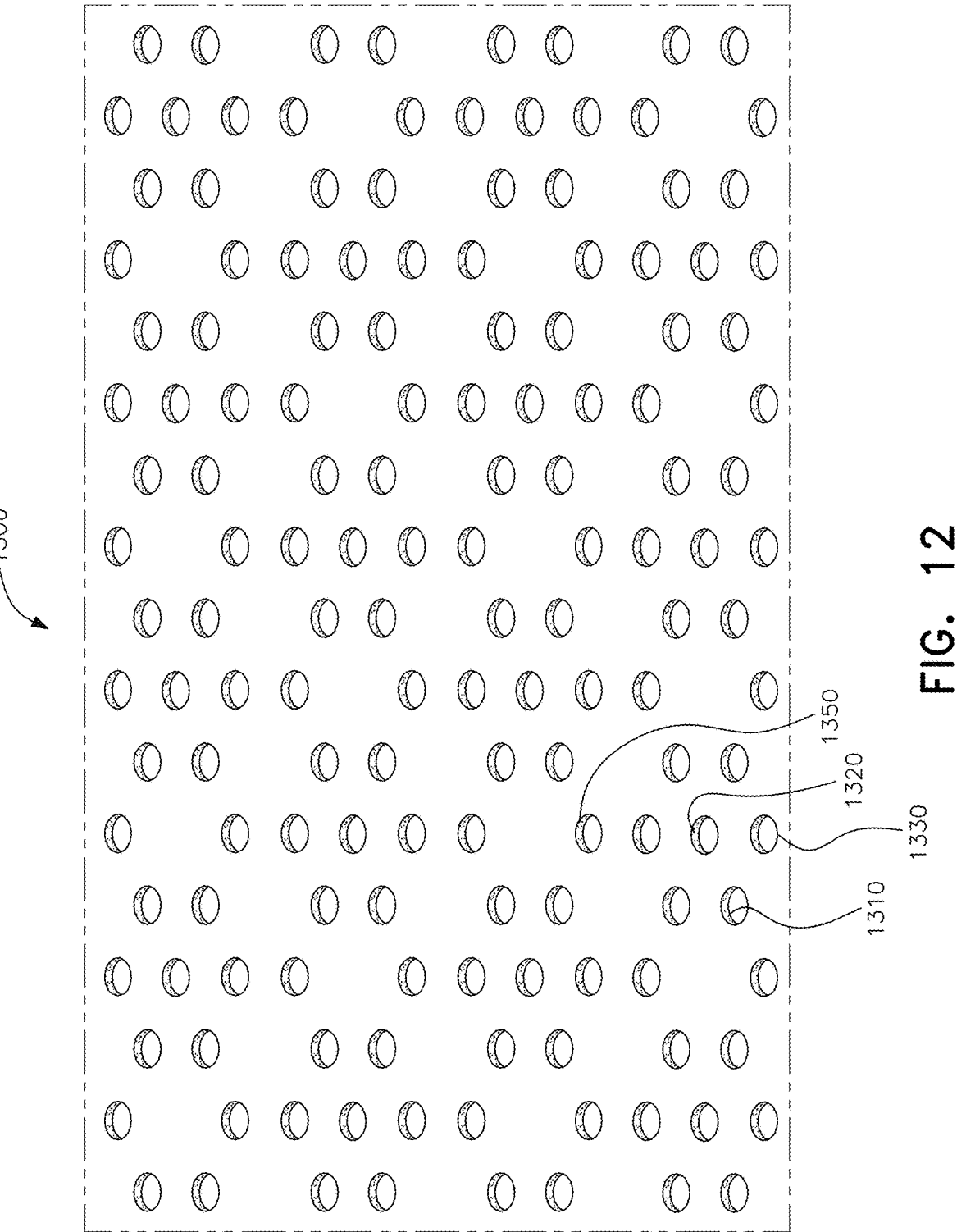
FIG. 12 is a top perspective view of a starting sheet having holes or depressions formed therein for forming the hexagonal expanded multilayer integral geogrid shown in FIG. 10.

FIG. 12 is a top perspective view of a multilayer polymer starting sheet 1300 having holes or depressions formed therein for forming the hexagonal expanded multilayer integral geogrid shown in FIGS. 10 and 11. The multilayer polymer starting sheet 1300 includes, disposed between a first outer layer 1310 and a second outer layer 1330, a third layer, i.e., an expandable inner layer 1320. As with the triangular and rectangular geometries described herein, the expandable inner layer 1320 contains a distribution of voids 1350 therein.

The multilayer polymer starting sheet 1300 used as the starting material for a hexagonal expanded multilayer integral geogrid according to the present invention is preferably through-punched, although it may be possible to use depressions formed therein instead. According to the embodiment of the starting material in which depressions are formed in the sheet, the depressions are provided on each side of the sheet, i.e., on both the top and the bottom of the sheet.

Figure 13:
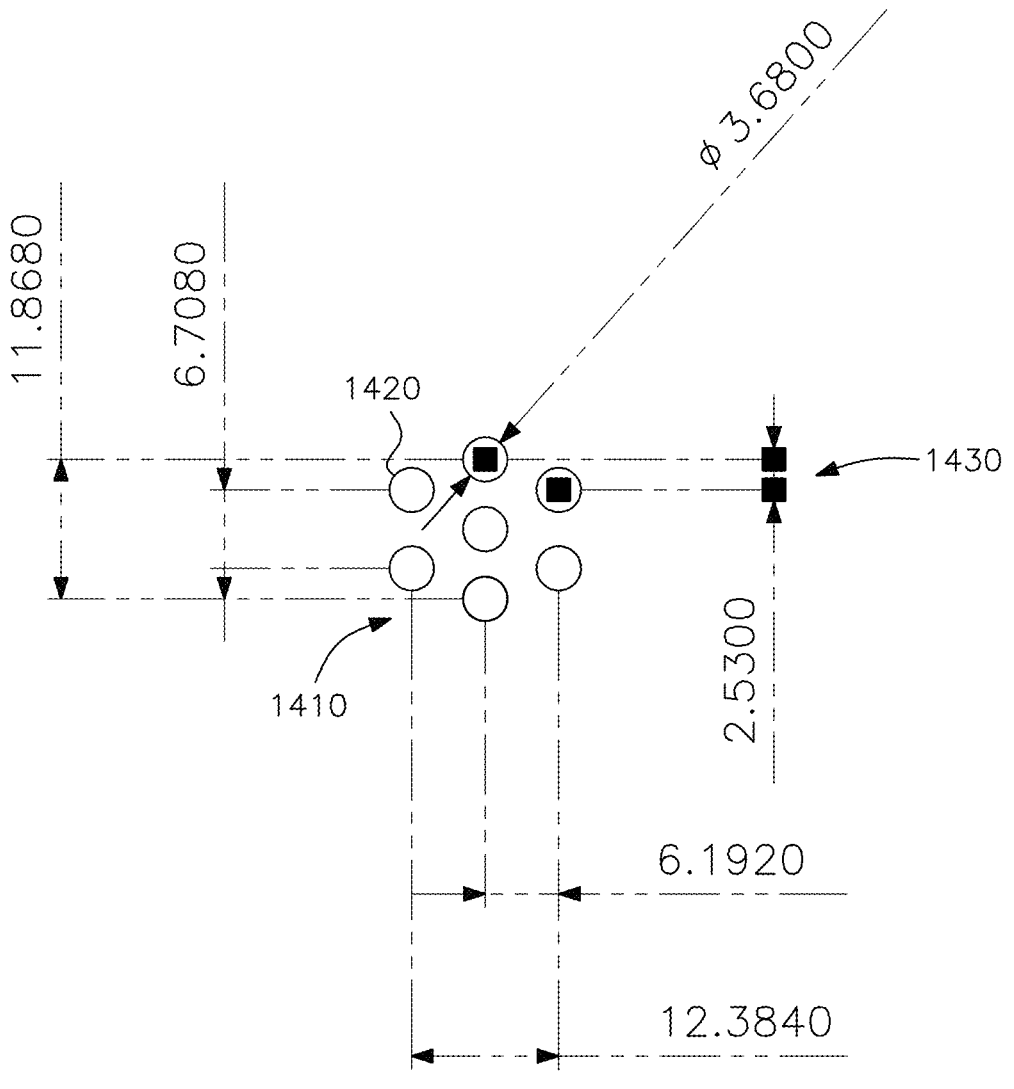
FIG. 13 is a plan view of a possible size and spacing for the holes shown in the starting sheet of FIG. 12.

As shown in FIG. 13, the multilayer polymer starting sheet 1300 of FIG. 12 includes a repeating pattern 1410 of holes 1420 and spacing 1430 that when oriented provide the floating hexagon within a hexagon pattern of the hexagonal expanded multilayer integral geogrid shown in FIGS. 10 and 11. According to one possible embodiment of the present invention, the diameter of holes 1420 is 3.68 mm, and the spacing of the holes 1420 is per the dimensions shown in FIG. 13.

Preferably, the overall thickness of the multilayer polymer starting sheet 1300 is from about 3 mm to about 10 mm and, more preferably, the overall thickness of the multilayer polymer starting sheet 1300 is from about 5 mm to about 8 mm.

And, in general, the multilayer polymer starting sheet 1300 is polymeric in nature. For example, the material of construction may include high molecular weight polyolefins, and broad specification polymers. Further, the polymeric materials may be virgin stock, or may be recycled materials, such as, for example, post-industrial or post-consumer recycled polymeric materials. And, the use of one or more polymeric layers having a lower cost than that of the aforementioned high molecular weight polyolefins and broad specification polymers is also contemplated. According to the preferred embodiment of the invention, the high molecular weight polyolefin is a polypropylene.

According to a preferred embodiment of the present invention, the strands 1120, 1140, 1145, 1150, and 1160 of the hexagonal expanded multilayer integral geogrid 1100 have what is known to one skilled in the art as a high aspect ratio, i.e., a ratio of the thickness or height of the strand cross section to the width of the strand cross section that is greater than 1.0 in accordance with the aforesaid Walsh patents, U.S. Pat. Nos. 9,556,580, 10,024,002, and 10,501,896. While not absolutely necessary for the present invention, a high aspect ratio for the strands or ribs is preferred. Thus, the multi-axial integral geogrid of the present invention provides enhanced compatibility between geogrid and aggregate, which results in improved interlock, lateral restraint, and confinement of the aggregate.

As with the rectangular and the triaxial embodiments of the expanded multilayer integral geogrid, the multiaxial "repeating floating hexagon within a hexagon pattern" embodiment of the expanded multilayer integral geogrid has an expanded layer that is either foamed or contains a particulate filler. And, the starting sheet of the multiaxial "repeating floating hexagon within a hexagon pattern" embodiment of the expanded multilayer integral geogrid is the same as previously disclosed herein for the triangular and rectangular embodiments and may have either a coextruded construction or a laminated construction.

The invention also relates to methods of making the above-described various embodiments of the expanded multilayer integral geogrids. For example, the method of making the above-described triaxial expanded multilayer integral geogrid 200 includes: providing the multilayer polymer starting sheet 100; forming a plurality of holes or depressions in the multilayer polymer starting sheet 100 in a selected pattern, such as in accordance with the disclosure of the Walsh '112 patent; and biaxially stretching and orienting the multilayer polymer starting sheet having the patterned plurality of holes or depressions therein to form an expanded multilayer integral geogrid having a plurality of interconnected, oriented strands between partially oriented junctions and to configure the holes or depressions as grid openings.

In general, once the multilayer polymer starting sheet 100 has been prepared with holes or depressions, the triaxial expanded multilayer integral geogrid 200 can be produced from the sheet 100 according to the methods described in the above-identified patents and known to those skilled in the art.

Further, with regard to the method of making the multi-axial "repeating floating hexagon within a hexagon pattern" embodiment of the expanded multilayer integral geogrid, the method includes providing a polymer sheet 1300; providing a patterned plurality of holes or depressions 1310 in the polymer sheet 1300; and orienting the polymer sheet 1300 having the patterned plurality of holes or depressions 1310 therein to provide a plurality of interconnected, oriented strands 1120, 1140, 1145, 1150, and 1160 having an array of openings 1170, 1180, and 1190 therein, a repeating floating hexagon 1130 within an outer hexagon 1110 pattern of the interconnected, oriented strands and the openings, including three linear strands that extend continuously throughout the entirety of the multi-axial expanded multilayer integral geogrid 1100.

In general, once the starting sheet 1300 has been prepared with holes or depressions, the multi-axial expanded multi-layer integral geogrid 1100 can be produced from the starting sheet 1300 according to the methods described in the above-identified patents and known to those skilled in the art.

As indicated above, the hexagonal geometric shape of the outer hexagon 1110 and smaller inner hexagon 1130 are a preferred embodiment for providing the floating geometric configuration of the present invention. However, other geometric shapes are possible within the scope of the present invention. For example, the geometric shapes could be rectangular or square with four supporting or connecting strands connecting each inner corner of the outer rectangle or square to the corresponding outer corner of the smaller inner rectangle or square. Or, the geometric shapes could be triangular with only three supporting or connecting strands between adjacent inner corners of the outer triangle and outer corners of the smaller inner triangle.

In the rectangular or square embodiment of the present invention, described in the preceding paragraph, there would preferably be two linear strands that extend continuously throughout the entirety of the geogrid for each outer rectangle or square, such continuous strands extending at an angle of approximately 90° from each other. In the triangular embodiment, there will likely be three linear strands for each outer triangle which extend from each other by approximately 120°, similar to linear strands 1120 of the preferred hexagon embodiment described in detail herein.

Also, different geometric shapes could be possible without departing from the present invention. For example, the inner geometric shape could be a circular ring supported within the preferred outer hexagon shape with six supporting strands similar to the preferred embodiment disclosed herein. Thus, it is intended that the geometric shapes of the outer repeating structure and the inner or interior floating structure not be limited to identical geometric forms.

Figure 14E:
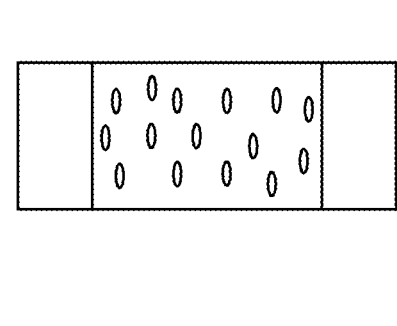
FIGS. 14A-14E illustrate a compression mechanism hypothesis of a three-layer expanded multilayer integral geogrid that is associated with voids in the expanded inner layer under applied load.
Figure 14D:
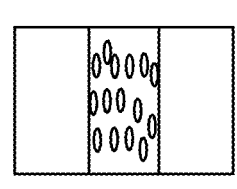
Figure 14C:
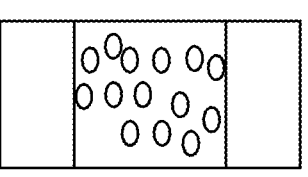
Figure 14B:
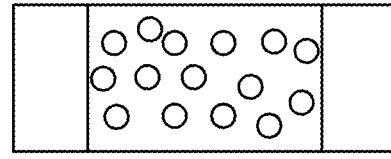
Figure 14A:
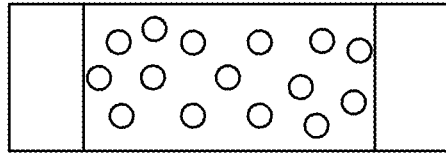

FIGS. 14A-14E illustrate a compression mechanism hypothesis of a three-layer expanded multilayer integral geogrid that is associated with voids in the expanded inner layer under applied load. As shown in FIG. 14A, prior to an applied loading, the voids and the polymer around it are undisturbed. As the loading begins (FIG. 14B), the polymer around the voids begins to compress. As loading continues (FIG. 14C), the polymer around the voids stops yielding, and the voids begin to compress. As more loading continues (FIG. 14D), the voids are completely compressed and the polymer around the voids begins to yield again. And finally, as shown in FIG. 14E, as the loading is removed, the rib of the expanded multilayer integral geogrid is decompressed, with permanent void deformation remaining due to the voids having collapsed to a certain degree, along with permanent deformation of the polymer around the voids.

Figures 15A, 15B, 15C:
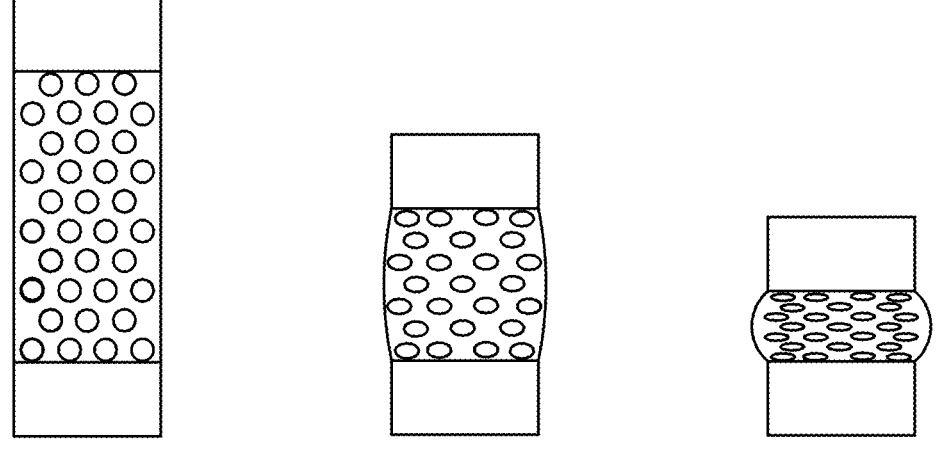
FIGS. 15A-15C illustrate a pliable rib mechanism hypothesis of the expanded inner layer of a three-layer expanded multilayer integral geogrid that is also associated with voids in the expanded inner layer, and demonstrates both vertical and horizontal pliability of the integral geogrid under applied load.

FIGS. 15A-15C illustrate a pliable rib mechanism hypothesis of the expanded inner layer of a three-layer expanded multilayer integral geogrid that is also associated with voids in the expanded inner layer, and demonstrates both vertical and horizontal pliability of the integral geogrid under applied load. As shown in FIG. 15A, prior to an applied loading, the voids and the polymer around the voids are undisturbed. As a load is applied (FIG. 15B), the system begins to undergo elastic compression as the voids begin to collapse. Finally, as shown in FIG. 15C, the system stops yielding as the voids begin to compress and densify. Thus, by virtue of the voids present in the expanded inner layer of the expanded multilayer integral geogrid, both vertical and horizontal pliability of the geogrid under load is achieved.

Figure 16:
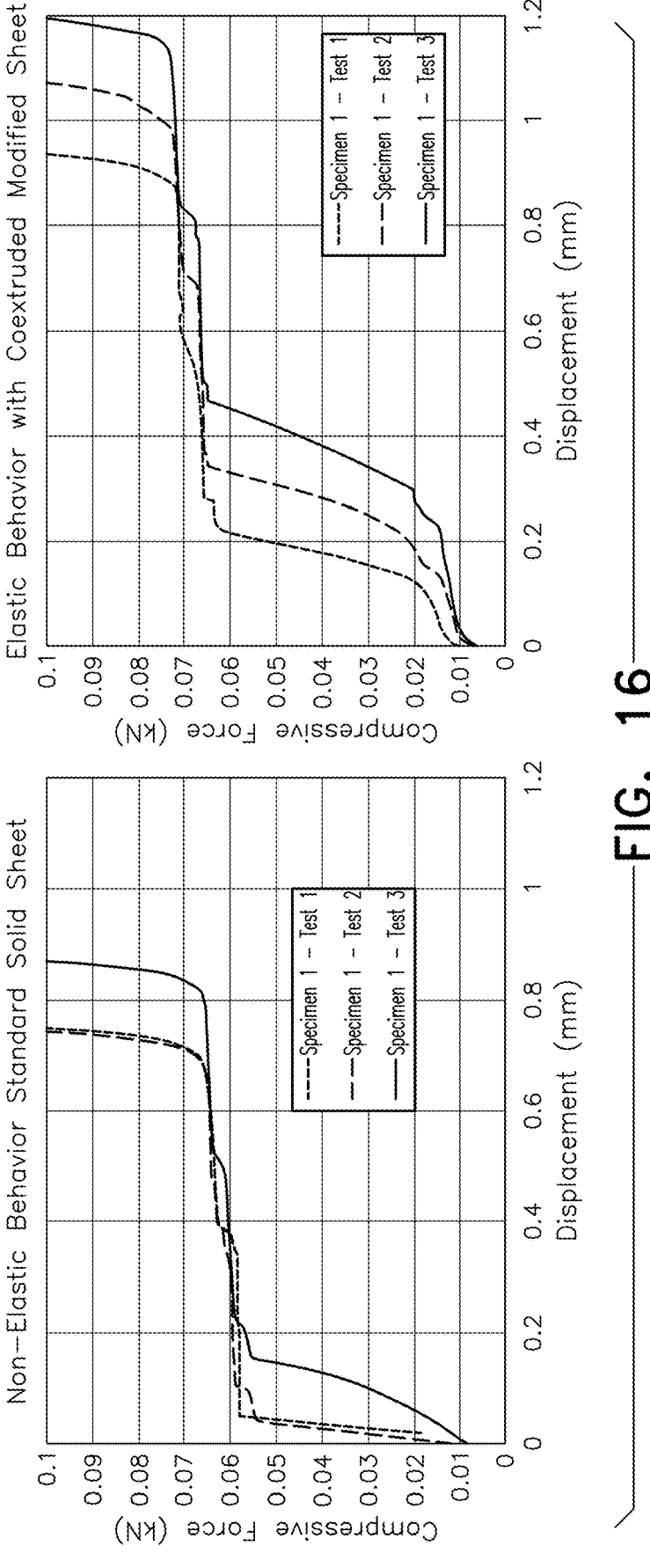
FIG. 16 presents graphs illustrating a comparison of the non-elastic rib behavior based on a starting sheet of a conventional integral geogrid, with the elastic rib behavior of a starting sheet of the expanded multilayer integral geogrid of the present invention having the expanded inner layer.

FIG. 16 presents graphs illustrating a comparison of the non-elastic rib behavior based on a starting sheet of a conventional integral geogrid, with the elastic rib behavior of a starting sheet of the present expanded multilayer integral geogrid having the expanded inner layer. As is evident, ribs of the expanded multilayer integral geogrid that are vertically and horizontally pliable facilitate more optimum aggregate positioning and densification. This feature of the expanded multilayer integral geogrid enables using "big" ribs without the ribs being "disrupters" of the aggregate system.

FIG. 17 presents a table comparing benefits of the expanded multilayer integral geogrid of the present invention versus a monolayer geogrid not having an expanded layer. Sample 1 is an integral geogrid having a triangular geometry made from a monolayer polypropylene starting sheet having a total starting sheet thickness of 4.15 mm. Sample 1 has a finished integral geogrid product weight of 200 g/m². Sample 2 is an integral geogrid having a triangular geometry made from an expanded multilayer starting sheet according to the present invention having a total starting sheet thickness of 4.2 mm. The multilayer structure of Sample 2 comprises a first polypropylene outer (i.e., upper) layer having a thickness of 0.5 mm, an inner expanded polypropylene layer having a thickness of 3.2 mm, and a second polypropylene outer (i.e., lower) layer having a thickness of 0.5 mm. Sample 2 has a finished integral geogrid product weight of 171 g/m². Samples 1 and 2 were subjected to simulated traffic testing in which the average surface deformation of the integral geogrid for the last 500 passes was determined, with the performance being measured as mm of surface deformation. The Sample 1 average surface deformation was 61.8 mm, and the Sample 2 average surface deformation was essentially the same, i.e., 61.6 mm.

As is evident from FIG. 17, Sample 2, the expanded multilayer integral geogrid according to the present invention, is 14.5% lighter than Sample 1, the non-expanded monolayer integral geogrid. Yet based on the trafficking test, Sample 2 achieves a surface deformation performance that is equivalent to that of the heavier Sample 1. Accordingly, by using the expanded multilayer integral geogrid technology of the present invention, product weight can be reduced, while still achieving surface deformation performance that is equivalent to that of a heavier, non-expanded, monolayer product.

Also per FIG. 17, Sample 3 is an integral geogrid having a triangular geometry made from a monolayer polypropylene starting sheet having a total starting sheet thickness of 4.55 mm. Sample 3 has a finished integral geogrid product weight of 217 g/m². Sample 4 is an integral geogrid having a triangular geometry made from an expanded multilayer starting sheet according to the present invention having a total starting sheet thickness of 6.2 mm. The multilayer structure of Sample 4 comprises a first polypropylene outer (i.e., upper) layer having a thickness of 1 mm, an inner expanded polypropylene layer having a thickness of 4.2 mm, and a second polypropylene outer (i.e., lower) layer having a thickness of 1 mm. Sample 4 has a finished integral geogrid product weight of 215 g/m², i.e., essentially the same weight as that of Sample 3. Samples 3 and 4 were also subjected to simulated traffic testing in which the average surface deformation of the integral geogrid for 500 passes was determined, with the performance being measured as mm of surface deformation. The Sample 3 average surface deformation was 46.4 mm, while the Sample 4 average surface deformation was substantially less, i.e., 37.2 mm.

As is evident from FIG. 17, Sample 4, the expanded multilayer integral geogrid according to the present invention, has a weight that is essentially the same as that of Sample 3, the non-expanded monolayer integral geogrid. Yet based on the trafficking test, Sample 4 achieves a surface deformation performance that is 19.8% better (i.e., less surface deformation) than Sample 3. Accordingly, by using the expanded multilayer integral geogrid technology of the present invention, product weight can be maintained, while achieving better surface deformation performance, i.e., less surface deformation, than that of a non-expanded, monolayer product.

In summary, by virtue of the expanded multilayer integral geogrids of the present invention having not only a multilayer construction, but with at least one inner layer thereof having a structure that is expanded relative to at least one other layer of the multiple layers as a result of the distribution of voids therein, the geogrids provide for increased layer compressibility under load.

Further, the multilayer nature of the expanded multilayer integral geogrids of the present invention impart overall greater stiffness to the integral geogrid relative to that of prior monolayer integral geogrids. In addition, by virtue of the expanded inner layer, the expanded multilayer integral geogrids of the present invention are characterized by a compliant, i.e., initial give or flexibility, that leads to better compaction and higher density, yet with a final horizontal aggregate geogrid composite stiffness that is greater as a result of the initial give.

In addition, the expanded multilayer integral geogrids of the present invention provide higher aspect ratios on all strands compared to those of prior integral geogrids. Because the high aspect ratio of the integral geogrids of the present invention increases aggregate interlock, the expanded multilayer integral geogrids of the present invention can better accommodate the varying aspect ratios of aggregate.

And finally, the expanded multilayer integral geogrids of the present invention, in addition to providing the structural and performance enhancements described herein, have significant economic benefits. If an integral geogrid having strands with a higher aspect ratio is desired, the expanded layer according to the present invention can provide that higher aspect ratio while using the same overall polymer content (i.e., "amount" of polymer) as a similarly configured integral geogrid not having an expanded layer. Or, if an integral geogrid having strands with a same aspect ratio as a similarly configured integral geogrid is desired, the expanded layer according to the present invention can provide that same aspect ratio while using less overall polymer content (i.e., "amount" of polymer). Accordingly, the expanded multilayer integral geogrids of the present invention, in addition to the structural and performance enhancements associated therewith, can provide significant economic benefits, i.e., achieving a higher aspect ratio at a same cost, or achieving a same aspect ratio at a lower cost.

The foregoing is considered as illustrative only of the principles of the invention. Further, since numerous modifications and changes may readily occur to those skilled in the art, it is not desired to limit the invention to the exact construction and operation described and shown.

What is claimed is:

1. A method of making an expanded multilayer integral geogrid, said method comprising:

providing a multilayer polymer sheet having a plurality of layers each of a polymeric material, with at least one inner layer of said plurality of layers capable of forming an expanded structure containing a distribution of voids therein;

providing a patterned plurality of holes or depressions in the multilayer polymer sheet; and orienting the multilayer polymer sheet having the patterned plurality of holes or depressions therein to provide a plurality of oriented strands interconnected by partially oriented junctions and to configure the holes or depressions as grid openings, forming a repeating pattern of outer hexagons having an array of the grid openings therein, supporting ribs extending inwardly from each of the outer hexagons to support inside each of the outer hexagons a smaller inner hexagon having an open center and oriented strands and tri-nodes, the outer hexagons, the supporting ribs and the inner hexagons defining three different geometric configurations which are repeating throughout an entirety of the expanded multilayer integral geogrid, the oriented strands and the partially oriented junctions of the outer hexagon forming a plurality of linear strands that extend continuously throughout an entirety of the expanded multilayer integral geogrid, and the expanded multilayer integral geogrid having the plurality of layers each of the polymeric material extending throughout the geogrid, the at least one inner layer having the expanded structure containing the distribution of voids in the expanded multilayer integral geogrid.

2. The method according to claim 1, wherein the at least one inner layer having the expanded structure includes a foam.

3. The method according to claim 1, wherein the at least one inner layer having the expanded structure includes a particulate filler.

4. The method according to claim 1, wherein the step of providing the multilayer polymer sheet is a step of coextruding.

5. The method according to claim 1, wherein the step of providing the multilayer polymer sheet is a step of laminating.

6. The method according to claim 1, wherein the multilayer polymer sheet having the patterned plurality of holes or depressions therein is oriented by uniaxial or biaxial stretching.

7. The method according to claim 1, wherein the multilayer polymer sheet includes a first layer, an expanded inner layer, and a third layer, with the first layer and the third layer being arranged on opposite planar surfaces of the expanded inner layer.

8. The method according to claim 1, wherein the multilayer polymer sheet has an initial thickness of at least 2 mm.

9. The method according to claim 7, wherein the multilayer polymer sheet first layer has a thickness of from about 0.5 mm to about 4.5 mm, the expanded inner layer has a thickness of from about 1 mm to about 9 mm, and the third layer has a thickness of from about 0.5 mm to about 4.5 mm.

10. The method according to claim 7, wherein the first layer has a material of construction of a polypropylene, the expanded inner layer has a material of construction of a virgin polypropylene or a recycled polypropylene, and the third layer has a material of construction of a polypropylene.

11. The method according to claim 1, wherein the at least one inner layer having the expanded structure has a void volume of from 5% to 60%.

12. The method according to claim 1, wherein the at least one inner layer having the expanded structure has a compressibility factor of from 5% to 75%.

13. The method according to claim 2, wherein the foam comprises a polypropylene and a foam additive.

14. The method according to claim 3, wherein the particulate filler is selected from the group consisting of a calcium carbonate, a hydrous magnesium silicate, a calcium sulphate, diatomaceous earth, a titanium dioxide, a nano-filler, a multi-wall carbon nanotube, a single wall carbon nanotube, a natural fiber, a synthetic fiber, dolomite, a silica, mica, and an aluminum hydrate.

15. The method according to claim 1, wherein the multilayer polymer sheet has a thickness of from about 2 mm to about 12 mm.

16. A soil construction comprising a mass of particulate material strengthened by embedding therein an expanded multilayer integral geogrid produced as claimed in claim 1.

17. A method of strengthening a mass of particulate material, comprising embedding in the mass of particulate material the expanded multilayer integral geogrid produced as claimed in claim 1.

* * * * *